(12) United States Patent
Yim

(10) Patent No.: US 12,374,244 B2
(45) Date of Patent: Jul. 29, 2025

(54) ELECTRONIC DEVICE AND METHOD OF DRIVING THE SAME

(71) Applicant: Samsung Display Co., Ltd., Yongin-Si (KR)

(72) Inventor: Dale Yim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/501,028

(22) Filed: Nov. 3, 2023

(65) Prior Publication Data

US 2024/0257675 A1    Aug. 1, 2024

(30) Foreign Application Priority Data

Jan. 30, 2023  (KR) .................. 10-2023-0012087

(51) Int. Cl.
*G09G 3/00* (2006.01)
*G09G 3/20* (2006.01)
*H04N 13/128* (2018.01)
*H04N 13/344* (2018.01)

(52) U.S. Cl.
CPC ........... *G09G 3/001* (2013.01); *G09G 3/2092* (2013.01); *H04N 13/128* (2018.05); *H04N 13/344* (2018.05); *G09G 2320/0626* (2013.01); *G09G 2320/0666* (2013.01)

(58) Field of Classification Search
CPC ................. G09G 3/001; G09G 3/2092; G09G 2320/0626; G09G 2320/0666; G09G 3/003; H04N 13/128; H04N 13/344; H04N 13/356; H04N 13/398; H04N 13/324

See application file for complete search history.

(56) References Cited

U.S. PATENT DOCUMENTS

| | | | | |
|---|---|---|---|---|
| 10,379,419 B1* | 8/2019 | Lu | ........................ | G02B 27/286 |
| 10,855,965 B1* | 12/2020 | Jiao | ....................... | H04N 13/383 |
| 2010/0103077 A1* | 4/2010 | Sugiyama | .......... | G02B 27/0172 |
| | | | | 340/425.5 |
| 2011/0254837 A1* | 10/2011 | Kang | ................... | H04N 13/156 |
| | | | | 345/419 |
| 2011/0292190 A1* | 12/2011 | Kim | ..................... | H04N 13/327 |
| | | | | 348/54 |
| 2011/0310090 A1* | 12/2011 | Kim | ..................... | G09G 3/3648 |
| | | | | 345/87 |
| 2011/0316848 A1* | 12/2011 | Newton | ................... | H04N 5/85 |
| | | | | 345/581 |
| 2012/0120057 A1* | 5/2012 | Cho | ..................... | H04N 13/398 |
| | | | | 345/204 |

(Continued)

*Primary Examiner* — Ibrahim A Khan
(74) *Attorney, Agent, or Firm* — Innovation Counsel LLP

(57) ABSTRACT

An electronic device comprises a first display panel including first pixels which display a left eye image, a second display panel including second pixels which display a right eye image, and a display panel driver configured to apply a left eye data voltage to the first pixels and to apply a right eye data voltage to the second pixels. The first display panel and the second display panel are configured to operate in a 2D image mode in which the left eye image and the right eye image which are identical to each other are displayed or to operate in a 3D image mode in which the left eye image and the right eye image which are different from each other are displayed, based on an image motion value and a 3D depth value.

17 Claims, 25 Drawing Sheets

(56) References Cited

U.S. PATENT DOCUMENTS

| | | | |
|---|---|---|---|
| 2012/0268460 A1* | 10/2012 | Hwangbo | H04N 13/356 345/419 |
| 2012/0268461 A1* | 10/2012 | Park | H04N 13/106 382/154 |
| 2015/0379772 A1* | 12/2015 | Hoffman | G02B 27/0093 345/633 |
| 2016/0133170 A1* | 5/2016 | Fateh | G06F 3/04817 345/428 |
| 2017/0195658 A1* | 7/2017 | Jung | G09G 3/3233 |
| 2017/0330496 A1* | 11/2017 | Oravainen | G06T 3/4092 |
| 2017/0336641 A1* | 11/2017 | von und zu Liechtenstein | G06T 19/006 |
| 2018/0005421 A1* | 1/2018 | Park | G09G 3/003 |
| 2018/0053284 A1* | 2/2018 | Rodriguez | G06T 3/4007 |
| 2018/0252922 A1* | 9/2018 | Fujimaki | A63F 13/211 |
| 2019/0339528 A1* | 11/2019 | Freeman | G09G 3/002 |
| 2019/0385342 A1* | 12/2019 | Freeman | G06T 11/00 |
| 2020/0186787 A1* | 6/2020 | Cantero Clares | H04N 13/106 |
| 2020/0228788 A1* | 7/2020 | Selan | H04N 13/327 |
| 2021/0094588 A1* | 4/2021 | Kim | B60K 35/211 |
| 2022/0121032 A1* | 4/2022 | Serizawa | H04N 5/64 |
| 2022/0357591 A1* | 11/2022 | Makinen | H04N 13/305 |
| 2023/0403386 A1* | 12/2023 | Da Veiga | H04N 13/261 |

* cited by examiner

N-1-th frame left eye image

N-th frame left eye image

N-1-th frame left eye image

N-th frame left eye image

N-1-th frame left eye image

N-th frame left eye image

N-th frame left eye image

N-th frame right eye image

N-th frame left eye image

N-th frame right eye image

N-th frame left eye image

N-th frame right eye image

FIG. 5

$$\begin{bmatrix} Y \\ Co \\ Cg \end{bmatrix} = \begin{bmatrix} \frac{1}{4} & \frac{1}{2} & \frac{1}{4} \\ \frac{1}{2} & 0 & -\frac{1}{2} \\ -\frac{1}{4} & \frac{1}{2} & -\frac{1}{4} \end{bmatrix} \times \begin{bmatrix} R \\ G \\ B \end{bmatrix}$$

300

FIG. 6A $$YH\_NML\_EVEN\_AVG = ROUNDUP\left(\frac{YH\_NML\_EVEN\_SUM}{N\_PH}\right)$$

310

$$YH\_NMR\_EVEN\_AVG = ROUNDUP\left(\frac{YH\_NMR\_EVEN\_SUM}{N\_PH}\right)$$

Y value of N−1-th frame left eye image data

|   | 1 | 2 | 3 | 4 | 5 |
|---|---|---|---|---|---|
| 1 | 50 | 36 | 255 | 42 | 250 |
| 2(1st even row) | 156 | 119 | 180 | 75 | 228 |
| 3 | 64 | 200 | 60 | 54 | 83 |
| 4(2nd even row) | 235 | 64 | 91 | 67 | 136 |

Y value of N-th frame left eye image data

|   | 1 | 2 | 3 | 4 | 5 |
|---|---|---|---|---|---|
| 1 | 126 | 134 | 90 | 120 | 163 |
| 2(1st even row) | 24 | 59 | 251 | 68 | 111 |
| 3 | 132 | 62 | 250 | 178 | 18 |
| 4(2nd even row) | 138 | 129 | 102 | 127 | 233 |

Y value of N-th frame right eye image data

|   | 1 | 2 | 3 | 4 | 5 |
|---|---|---|---|---|---|
| 1 | 188 | 213 | 145 | 160 | 175 |
| 2(1st even row) | 193 | 85 | 17 | 246 | 136 |
| 3 | 169 | 81 | 97 | 132 | 206 |
| 4(2nd even row) | 170 | 76 | 224 | 4 | 134 |

FIG. 7A $$Y\_NL\_MOVE = ROUNDUP\left(SUM\left(\frac{|YH\_NML\_EVEN\_AVG - YH\_N-1ML\_EVEN\_AVG|}{N\_PV \times 0.5}\right)\right)$$

Y value of N-1-th frame left eye image data

| | 1 | 2 | 3 | 4 | 5 |
|---|---|---|---|---|---|
| 1 | 50 | 36 | 255 | 42 | 250 |
| 2(1st even row) | 156 | 119 | 180 | 75 | 228 |
| 3 | 64 | 200 | 60 | 54 | 83 |
| 4(2nd even row) | 235 | 64 | 91 | 67 | 136 |

Y value of N-th frame left eye image data

| | 1 | 2 | 3 | 4 | 5 |
|---|---|---|---|---|---|
| 1 | 126 | 134 | 90 | 120 | 163 |
| 2(1st even row) | 24 | 59 | 251 | 68 | 111 |
| 3 | 132 | 62 | 250 | 178 | 18 |
| 4(2nd even row) | 138 | 129 | 102 | 127 | 233 |

FIG. 8A $$Y\_N\_DEPTH = ROUNDUP\left(SUM\left(\frac{|YH\_NML\_EVEN\_AVG - YH\_NMR\_EVEN\_AVG|}{N\_PV \times 0.5}\right)\right)$$

Y value of N-th frame left eye image data

| | 1 | 2 | 3 | 4 | 5 |
|---|---|---|---|---|---|
| 1 | 126 | 134 | 90 | 120 | 163 |
| 2(1st even row) | 24 | 59 | 251 | 68 | 111 |
| 3 | 132 | 62 | 250 | 178 | 18 |
| 4(2nd even row) | 138 | 129 | 102 | 127 | 233 |

Y value of N-th frame right eye image data

| | 1 | 2 | 3 | 4 | 5 |
|---|---|---|---|---|---|
| 1 | 188 | 213 | 145 | 160 | 175 |
| 2(1st even row) | 193 | 85 | 17 | 246 | 136 |
| 3 | 169 | 81 | 97 | 132 | 206 |
| 4(2nd even row) | 170 | 76 | 224 | 4 | 134 |

FIG. 9A $$Y\_NR\_MOVE = ROUNDUP\left(SUM\left(\frac{|YH\_NMR\_EVEN\_AVG - YH\_N-1MR\_EVEN\_AVG|}{N\_PV \times 0.5}\right)\right) \quad 340$$

FIG. 10A $$YH\_NML\_ODD\_AVG = ROUNDUP \left( \frac{YH\_NML\_ODD\_SUM}{N\_PH} \right) \overset{350}{\curvearrowleft}$$

$$YH\_NMR\_ODD\_AVG = ROUNDUP \left( \frac{YH\_NMR\_ODD\_SUM}{N\_PH} \right) \overset{355}{\curvearrowleft}$$

FIG. 11A $$Y\_NL\_MOVE = ROUNDUP\left(SUM\left(\frac{|YH\_NML\_ODD\_AVG - YH\_N-1ML\_ODD\_AVG|}{N\_PV \times 0.5}\right)\right)$$

360

FIG. 12A $$Y\_NR\_MOVE = ROUNDUP\left(SUM\left(\frac{|YH\_NMR\_ODD\_AVG - YH\_N-1MR\_ODD\_AVG|}{N\_PV \times 0.5}\right)\right)$$

370

FIG. 13A $$Y\_N\_DEPTH = ROUNDUP\left(SUM\left(\frac{|YH\_NML\_ODD\_AVG - YH\_NMR\_ODD\_AVG|}{N\_PV \times 0.5}\right)\right)$$

380

ELECTRONIC DEVICE AND METHOD OF DRIVING THE SAME

This application claims priority under 35 USC § 119 to Korean Patent Application No. 10-2023-0012087 filed on Jan. 30, 2023, in the Korean Intellectual Property Office (KIPO), the entire disclosure of which is incorporated by reference herein.

BACKGROUND

1. Field

Embodiments of the present inventive concept relate to an electronic device and a method of driving the same. More particularly, embodiments of the present inventive concept relate to an electronic device and a method of driving the same for supporting a 2D image mode or a 3D image mode.

2. Description of the Related Art

Generally, a display device may include a display panel and a display panel driver. The display panel may include gate lines, data lines, and pixels. The display panel driver may include a gate driver for providing gate signals to the gate lines, a data driver for providing data voltages to the data lines, and a driving controller for controlling the gate driver and the data driver.

A currently commercialized 3D image electronic device realizes 3D depth by providing different images to a user's eyes, respectively. However, this method may provide only binocular disparity information to the user, but may not transfer monocular depth perception factors such as focus control and motion disparity. Therefore, dizziness may be caused when the 3D depth is large and image motion is large.

SUMMARY

Embodiments of the present inventive concept provide an electronic device for relieving a user's dizziness based on an image motion value and a 3D depth value.

Embodiments of the present inventive concept provide a method of driving the electronic device.

In an embodiment of an electronic device according to the present inventive concept, the electronic device comprises a first display panel including first pixels which display a left eye image, a second display panel including second pixels which display a right eye image, and a display panel driver configured to apply a left eye data voltage to the first pixels and to apply a right eye data voltage to the second pixels. The first display panel and the second display panel are configured to operate in a 2D image mode in which the left eye image and the right eye image which are identical to each other are displayed or to operate in a 3D image mode in which the left eye image and the right eye image which are different from each other are displayed, based on an image motion value and a 3D depth value.

In an embodiment, when the image motion value is greater than a motion threshold value and the 3D depth value is greater than a depth threshold value, the first display panel and the second display panel may display in the 2D image mode.

In an embodiment, when the image motion value is less than or equal to the motion threshold value or the 3D depth value is less than or equal to the depth threshold value, the first display panel and the second display panel may display in the 3D image mode.

In an embodiment, when the image motion value is greater than the motion threshold value, the 3D depth value is greater than the depth threshold value, and a duration time during which the image motion value is greater than the motion threshold value and the 3D depth value is greater than the depth threshold value is greater than a duration time threshold value, the first display panel and the second display panel may display in the 2D image mode.

In an embodiment, the image motion value may be determined based on a difference between previous frame data of the left eye image and current frame data of the left eye image or a difference between previous frame data of the right eye image and current frame data of the right eye image.

In an embodiment, the 3D depth value may be determined based on a difference between current frame data of the left eye image and current frame data of the right eye image.

In an embodiment, the display panel driver may be configured to convert RGB data of left eye image data for the first pixels into YCoCg data of the left eye image data, and the display panel driver may be configured to convert RGB data of right eye image data for the second pixels into YCoCg data of the right eye image data.

In an embodiment, the display panel driver may be configured to convert the RGB data of the left eye image data into the YCoCg data of the left eye image data and to determine an average Y value of an M-th even-numbered pixel row of an N-th frame left eye image data an equation "YH_NML_EVEN_AVG=ROUNDUP(YH_NML_EVEN_SUM/N_PH)", and the display panel driver may be configured to convert the RGB data of the right eye image data into the YCoCg data of the right eye image data, and to determine an average Y value of an M-th even-numbered pixel row of an N-th frame right eye image data using an equation "YH_NMR_EVEN_AVG=ROUNDUP(Y_NMR_EVEN_SUM/N_PH)", where YH_NML_EVEN_AVG is the average Y value of the M-th even-numbered pixel row of the N-th frame left eye image data, ROUNDUP is a function which rounds up to one decimal place, YH_NML_EVEN_SUM is a sum of the Y values of the M-th even-numbered pixel row of the N-th frame left eye image data, N_PH is a number of columns of the first pixels and the second pixels, YH_NMR_EVEN_AVG is the average Y value of the M-th even-numbered pixel row of the N-th frame right eye image data, and YH_NMR_EVEN_SUM is a sum of the Y values of the M-th even-numbered pixel row of the N-th frame right eye image data (N is a positive integer greater than or equal to 2 and M is a positive integer greater than or equal to 1).

In an embodiment, the display panel driver may be configured to determine an image motion value of the N-th frame left eye image data based on an average Y value of M-th even-numbered pixel row of N−1-th frame left eye image data and the average Y value of the M-th even-numbered pixel row of the N-th frame left eye image data.

In an embodiment, the display panel driver may be configured to determine the image motion value of the N-th frame left eye image data using an equation "Y_NL_MOVE=ROUNDUP{SUM(|YH_NML_EVEN_AVG−YH_N−1ML_EVEN_AVG|)/(N_PV*0.5)}", where Y_NL_MOVE is the image motion value of the N-th frame left eye image data, SUM is a function which calculates a sum value, YH_N−1ML_EVEN_AVG is the average Y value of the M-th even-numbered pixel row of the N−1-th frame left eye image data, and N_PV is a number of rows of the first pixels and the second pixels.

In an embodiment, the display panel driver may be configured to determine an image motion value of the N-th frame right eye image data based on an average Y value of M-th even-numbered pixel row of N−1-th frame right eye image data and the average Y value of the M-th even-numbered pixel row of the N-th frame right eye image data.

In an embodiment, the display panel driver may be configured to determine the image motion value of the N-th frame right eye image data using an equation "Y_NR_MOVE=ROUNDUP{SUM(|YH_NMR_EVEN_AVG−YH_N−1MR_EVEN_AVG|)/(N_PV*0.5)}", where Y_NR_MOVE is the image motion value of the N-th frame right eye image data, SUM is a function which calculates a sum value, YH_N−1MR_EVEN_AVG is the average Y value of the M-th even-numbered pixel row of the N−1-th frame right eye image data, and N_PV is a number of rows of the first pixels and the second pixels.

In an embodiment, the electronic device may further comprise a processor configured to output the left eye image data and the right eye image data to the display panel driver. The processor may be configured to determine a 3D depth value of the N-th frame left eye image data and the N-th frame right eye image data based on the average Y value of the M-th even-numbered pixel row of the N-th frame left eye image data and the average Y value of the M-th even-numbered pixel row of the N-th frame right eye image data.

In an embodiment, the processor may be configured to determine the 3D depth value of the N-th frame left eye image data and the N-th frame right eye image data using an equation "Y_N_DEPTH=ROUNDUP{SUM(|YH_NML_EVEN_AVG−YH_NMR_EVEN_AVG|)/(N_PV*0.5)}", where Y_N_DEPTH is the 3D depth value of the N-th frame left eye image data and the N-th frame right eye image data, SUM is a function which calculates a sum value, and N_PV is a number of rows of the first pixels and the second pixels.

In an embodiment, the display panel driver may be configured to convert the RGB data of the left eye image data into the YCoCg data of the left eye image data and to determine an average Y value of an M-th odd-numbered pixel row of an N-th frame left eye image data using an equation "YH_NML_ODD_AVG=ROUNDUP(YH_NML_ODD_SUM/N_PH)", and the display panel driver may be configured to convert the RGB data of the right eye image data into the YCoCg data of the right eye image data and to determine an average Y value of an M-th odd-numbered pixel row of an N-th frame right eye image data using an equation "YH_NMR_ODD_AVG=ROUNDUP(Y_NM-R_ODD_SUM/N_PH)", where YH_NML_ODD_AVG is the average Y value of the M-th odd-numbered pixel row of the N-th frame left eye image data, ROUNDUP is a function which rounds up to one decimal place, YH_NML_ODD_SUM is a sum of the Y values of the M-th odd-numbered pixel row of the N-th frame left eye image data, N_PH is a number of columns of the first pixels and the second pixels, YH_NMR_ODD_AVG is the average Y value of the M-th odd-numbered pixel row of the N-th frame right eye image data, and YH_NMR_ODD_SUM is a sum of the Y values of the M-th odd-numbered pixel row of the N-th frame right eye image data (N is a positive integer greater than or equal to 2 and M a positive integer greater than or equal to 1).

In an embodiment, the display panel driver may be configured to determine the image motion value of the N-th frame left eye image data based on an average Y value of M-th odd-numbered pixel row of N−1-th frame left eye image data and the average Y value of the M-th odd-numbered pixel row of the N-th frame left eye image data.

In an embodiment, the electronic device may further comprise a processor configured to output the left eye image data and the right eye image data to the display panel driver. The processor may be configured to determine a 3D depth value of the N-th frame left eye image data and the N-th frame right eye image data based on the average Y value of the M-th odd-numbered pixel row of the N-th frame left eye image data and the average Y value of the M-th odd-numbered pixel row of the N-th frame right eye image data.

In an embodiment of a method of driving an electronic device according to the present inventive concept, the method comprises receiving left eye image data and right eye image data, determining an image motion value, determining a 3D depth value, and determining a 2D image mode in which a left eye image and a right eye image are identically displayed or a 3D image mode in which the left eye image and the right eye image are differently displayed, based on the image motion value and the 3D depth value.

In an embodiment, when the image motion value is greater than a motion threshold value and the 3D depth value is greater than a depth threshold value, a first display panel and a second display panel may be configured to operate in the 2D image mode.

In an embodiment, when the image motion value is less than or equal to the motion threshold value or the 3D depth value is less than or equal to the depth threshold value, the first display panel and the second display panel may be configured to operate in the 3D image mode.

According to the electronic device and the method of driving the electronic device according to the embodiment, the electronic device and the method of driving the electronic device may operate in the 2D image mode in which the left eye image and the right eye image which are identical to each other are displayed based on the image motion value and the 3D depth value or operate in the 3D image mode in which the left eye image and the right eye image which are different from each other are displayed based on the image motion value and the 3D depth value, so that a user's dizziness may be relieved.

BRIEF DESCRIPTION OF THE DRAWINGS

The above and other features of embodiments of the present inventive concept will become more apparent by describing in detailed embodiments thereof with reference to the accompanying drawings, in which:

FIG. 5 is a diagram for illustrating an operation of converting RGB data into YCoCg data by a first driving controller and a second driving controller;

FIG. 6A is a diagram for illustrating an equation for calculating an average value of Y values of an M-th even-numbered pixel row of an N-th frame left eye image data and an average value of Y values of an M-th even-numbered pixel row of an N-th frame right eye image data;

FIG. 6C is a diagram for illustrating an example of the average Y value of the M-th even-numbered pixel row of the N-th frame left eye image data and the average Y value of the M-th even-numbered pixel row of the N-th frame right eye image data in FIG. 6B;

FIG. 7A is a diagram for illustrating an equation for calculating an image motion value of N-th frame left eye image data;

FIG. 7C is a diagram for illustrating an example of the image motion value of the N-th frame left eye image data in FIG. 7B;

FIG. 8A is a diagram for illustrating an equation for calculating a 3D depth value of an N-th frame left eye image data and an N-th frame right eye image data;

FIG. 8C is a diagram for illustrating an example of the 3D depth value of the N-th frame left eye image data and the N-th frame right eye image data in FIG. 8B;

FIG. 9A is a diagram for illustrating an equation for calculating an image motion value of an N-th frame right eye image data;

FIG. 10A is a diagram for illustrating an equation for calculating an average value of Y values of an M-th odd-numbered pixel row of an N-th frame left eye image data and an average value of Y values of an M-th odd-numbered pixel row of an N-th frame right eye image data;

FIG. 11A is a diagram for illustrating an equation for calculating an image motion value of an N-th frame left eye image data;

FIG. 12A is a diagram for illustrating an equation for calculating an image motion value of an N-th frame right eye image data;

FIG. 13A is a diagram for illustrating an equation for calculating an image motion value of an N-th frame right eye image data;

DETAILED DESCRIPTION OF THE EMBODIMENTS

Hereinafter, embodiments of the present inventive concept will be described in detail with reference to the accompanying drawings.

Figure 1:
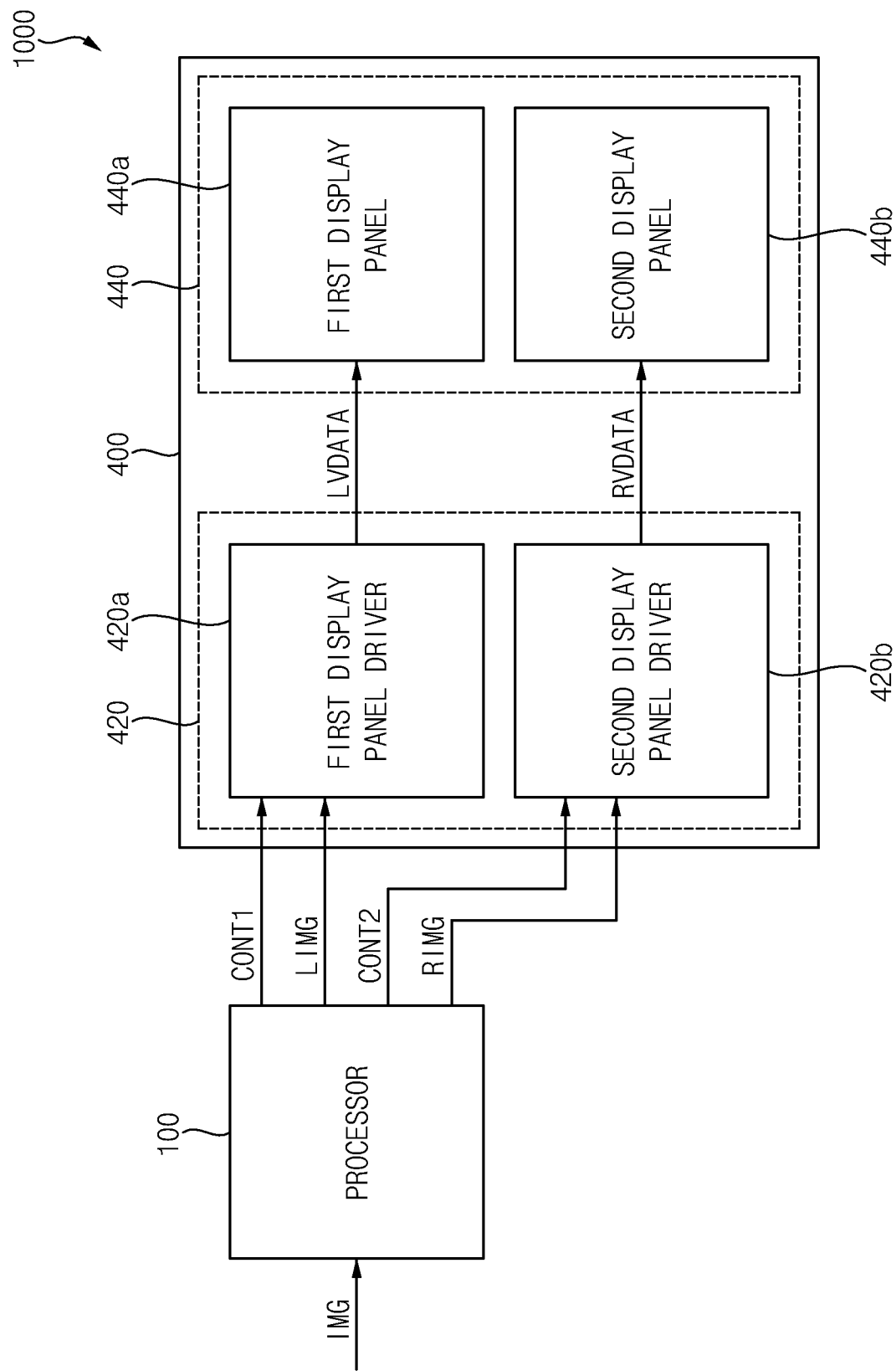
FIG. 1 is a block diagram for illustrating an electronic device according to embodiments of the present inventive concept.

FIG. 1 is a block diagram for illustrating an electronic device 1000 according to embodiments of the present inventive concept.

Referring to FIG. 1, the electronic device 1000 may include a processor 100 and a display device 400.

In an embodiment, the electronic device 1000 may be implemented as a head mounted display. In an embodiment, the electronic device 1000 may be implemented as a smart glasses.

The processor 100 may receive input image data IMG including left eye image data LIMG and right eye image data RIMG from an outside. The processor 100 may perform certain calculations or tasks. The processor 100 may be a microprocessor, a central processing unit, an application processor, or the like.

The electronic device 1000 may operate in a 2D image mode or a 3D image mode. In the 2D image mode, a left eye image and a right eye image may be identical. In the 3D image mode, the left eye image and the right eye image may be different. The 3D image mode may provide 3D depth by providing different images to a user's eyes, respectively.

The processor 100 may transfer the left eye image data LIMG and the right eye image data RIMG to a display panel driver 420 included in the display device 400.

The display device 400 may include a display panel 440 including a first display panel 440a and a second display panel 440b and the display panel driver 420 for driving the display panel 440. The first display panel 440a may display the left eye image. The second display panel 440b may display the right eye image.

The display panel driver 420 may include a first display panel driver 420a for driving the first display panel 440a and a second display panel driver 420b for driving the second display panel 440b.

Figure 2:
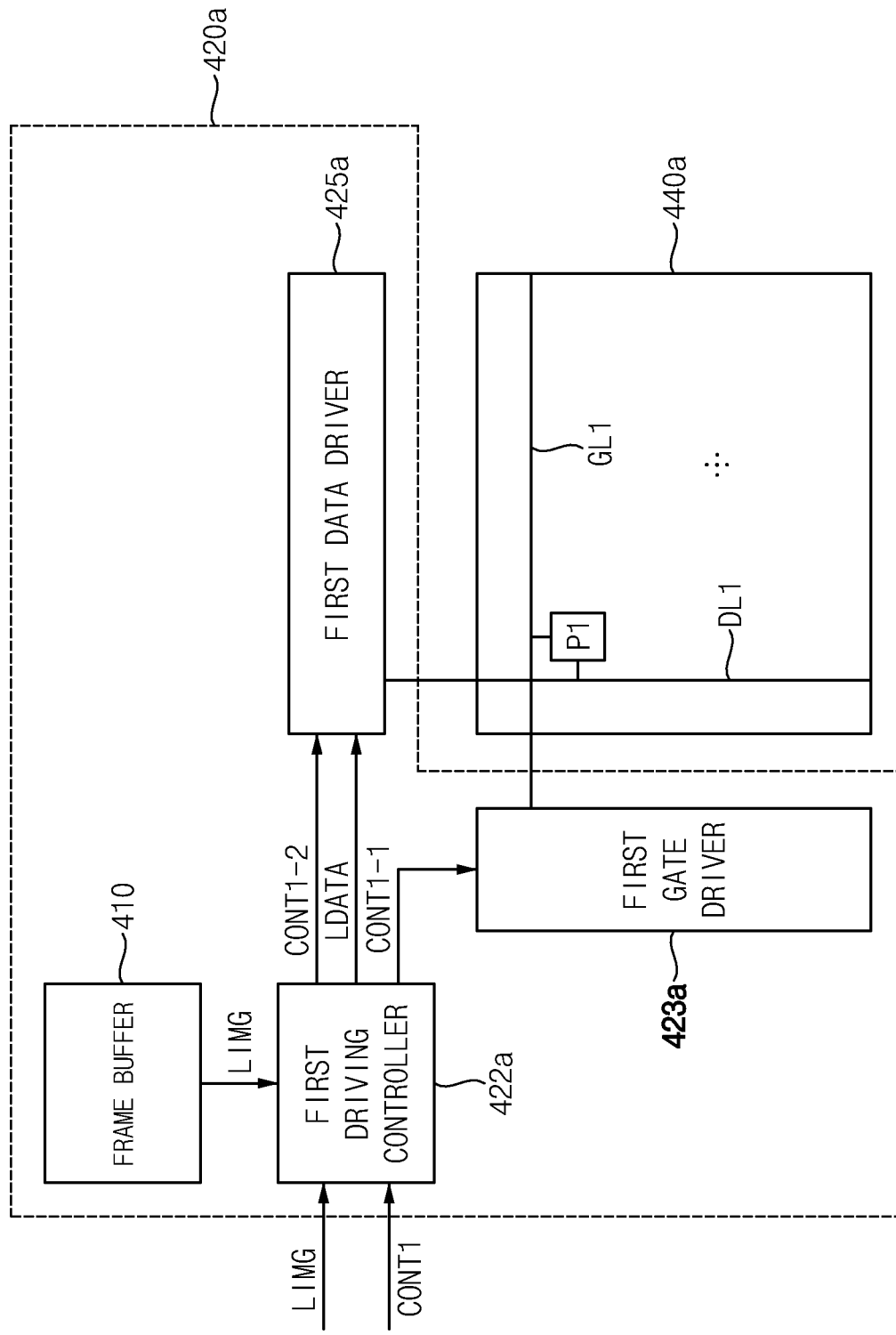
FIG. 2 is a block diagram for illustrating a first display panel and a first display panel driver included in the electronic device of FIG. 1.

FIG. 2 is a block diagram for illustrating a first display panel 440a and a first display panel driver 420a included in the electronic device 1000 of FIG. 1.

Referring to FIGS. 1 and 2, the display device 100 may include the first display panel 440a and the first display panel driver 420a for driving the first display panel 440a. The first display panel driver 420a may include a frame buffer 410, a first driving controller 422a, a first gate driver 423a, and a first data driver 425a.

The first driving controller 422a and the first data driver 425a may be embedded in one IC chip. The first driving controller 422a, the first gate driver 423a, and the first data driver 425a may be embedded in one IC chip. A driving module in which at least the first driving controller 422a and the first data driver 425a are embedded in one IC chip may be referred to as a timing controller embedded data driver (TED).

The first display panel 440a may include a display region displaying an image and a peripheral region disposed adjacent to the display region.

The first display panel 440a may be an organic light emitting diode display panel including organic light emitting diodes. The first display panel 440a may be a quantum-dot organic light emitting diode display panel including organic light emitting diodes and quantum-dot color filters. The first display panel 440a may be a quantum-dot nano light emitting diode display panel including nano light emitting diodes and quantum-dot color filters.

The first display panel 440a may include first gate lines GL1, first data lines DL1, and first pixels P1 electrically connected to the first gate lines GL1 and the first data lines DL1.

The first driving controller 422a may receive the left eye image data LIMG and a first input control signal CONT1 from the processor 100. For example, the left eye image data LIMG may include red image data, green image data, and blue image data. According to embodiments, the left eye image data LIMG may further include white image data. For another example, the left eye image data LIMG may include magenta image data, yellow image data, and cyan image data. The first input control signal CONT1 may include a master clock signal and a data enable signal. The first input control signal CONT1 may further include a vertical synchronization signal and a horizontal synchronization signal.

The first driving controller 422a may generate 1-1 control signal CONT1-1, 1-2 control signal CONT1-2, and a left eye data signal LDATA based on the left eye image data LIMG and the first input control signal CONT1.

The first driving controller 422a may generate the 1-1 control signal CONT1-1 for controlling an operation of the first gate driver 423a based on the first input control signal CONT1 to output the 1-1 control signal CONT1-1 to the first gate driver 422a. The 1-1 control signal CONT1-1 may include a vertical start signal and a gate clock signal.

The first driving controller 422a may generate the 1-2 control signal CONT1-2 for controlling an operation of the first data driver 425a based on the first input control signal CONT1 to output the 1-2 control signal CONT1-2 to the first data driver 425a. The 1-2 control signal CONT1-2 may include a horizontal start signal and a load signal.

The first driving controller 422a may generate the left eye data signal LDATA based on the left eye image data LIMG. The first driving controller 422a may output the left eye data signal LDATA to the first data driver 425a.

The frame buffer 410 may store the left eye image data LIMG received from the processor 100. The frame buffer 410 may transfer the left eye image data LIMG stored in the frame buffer 410 to the first driving controller 422a. The first driving controller 422a may determine an image motion value based on the left eye image data LIMG stored in the frame buffer 410. For example, the frame buffer 410 may store an N-1-th frame left eye image data LIMG[N-1] in an N-1-th frame (N is a positive integer greater than or equal to 2), the frame buffer 410 may transfer the N-1-th frame left eye image data LIMG[N-1] to the first driving controller 422a in an N-th frame. In the N-th frame, the first driving controller 422a may determine an image motion value of an N-th frame left eye image data LIMG[N] based on the N-1-th frame left eye image data LIMG[N-1] received from the frame buffer 410 and the N-th frame left eye image data LIMG[N] received from the processor 100. Although the frame buffer 410 has been described as being included in the first display panel driver 420a, it is not limited thereto. For example, the frame buffer 410 may be included in the display device 400 as a component which is separate from the first display panel driver 420a.

The first gate driver 423a may generate left eye gate signals for driving the first gate lines GL1 in response to the 1-1 control signal CONT1-1 received from the first driving controller 422a. The first gate driver 423a may output the left eye gate signals to the first gate lines GL1.

In an embodiment, the first gate driver 423a may be integrated in the periphery of the first display panel 440a.

The first data driver 425a may receive the 1-2 control signal CONT1-2 and the left eye data signal LDATA from the first driving controller 422a. The first data driver 425a may convert the left eye data signal LDATA into an analog data voltage. The first data driver 425a may output a left eye data voltage LVDATA to the first data line DL1.

The second display panel 440b may be substantially equal to the first display panel 440a. The second display panel 440b may include second gate lines, second data lines, and second pixels electrically connected to the second gate lines and the second data lines, respectively.

The second display panel driver 420b may be substantially equal to the first display panel driver 420a except that the frame buffer 410 is not included. Therefore, redundant descriptions of the same or corresponding components will be omitted. In an embodiment, the frame buffer 410 may be included in the first display panel driver 420a. In an embodiment, the frame buffer 410 may be included in the second display panel driver 420b. In an embodiment, the frame buffer 410 may be included in each of the first display panel driver 420a and the second display panel driver 420b. The second display panel driver 420b may include a second driving controller, a second gate driver, and a second data driver.

Meanwhile, a currently commercialized 3D image electronic device realizes the 3D depth by providing the different images to the user's the eyes, respectively. However, this method may provide only binocular disparity information to the user, but may not transfer monocular depth perception factors such as focus control and motion disparity. Therefore, dizziness may be caused when the 3D depth is large and image motion is large.

Figure 3A:
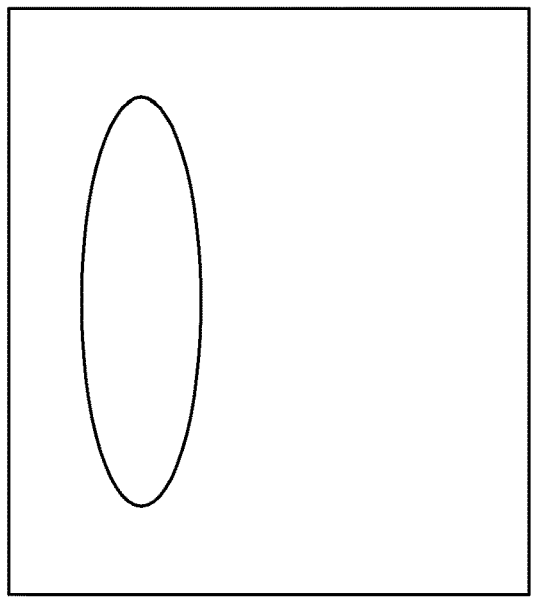
FIGS. 3A, 3B and 3C are diagrams for illustrating image motion.
Figure 3A:
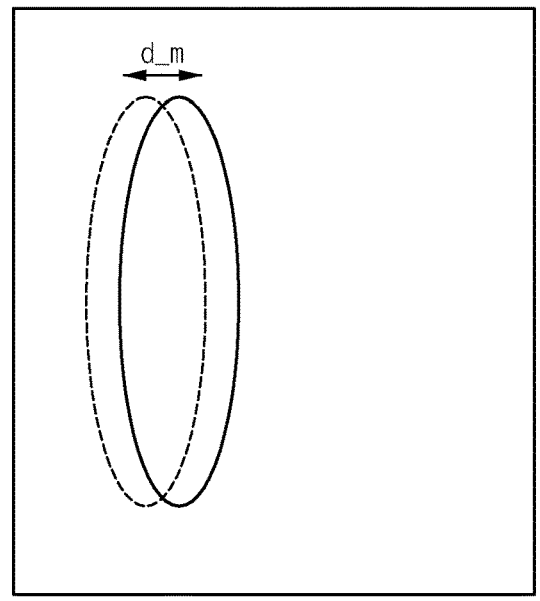
Figure 3B:
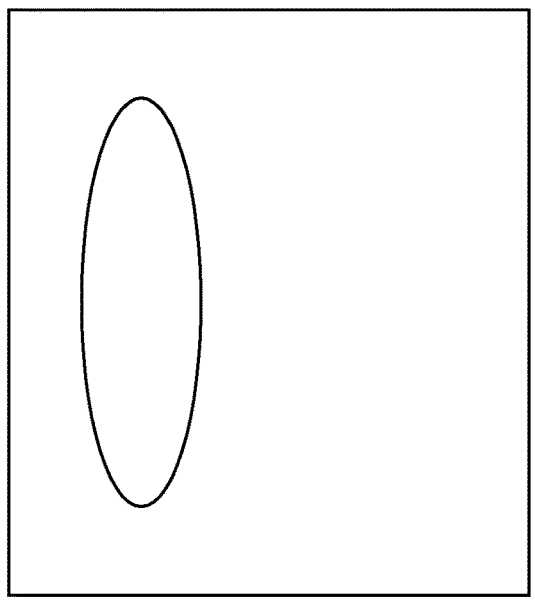
Figure 3B:
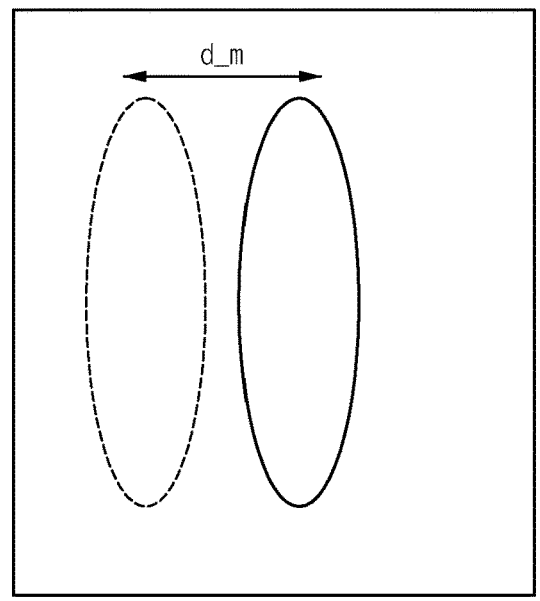
Figure 3C:
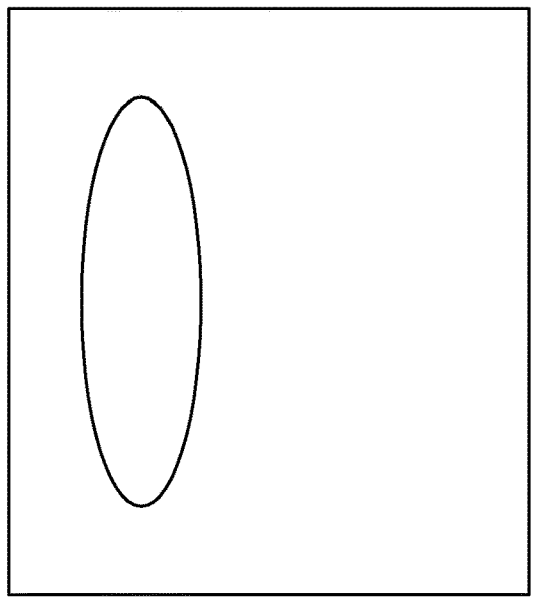
Figure 3C:
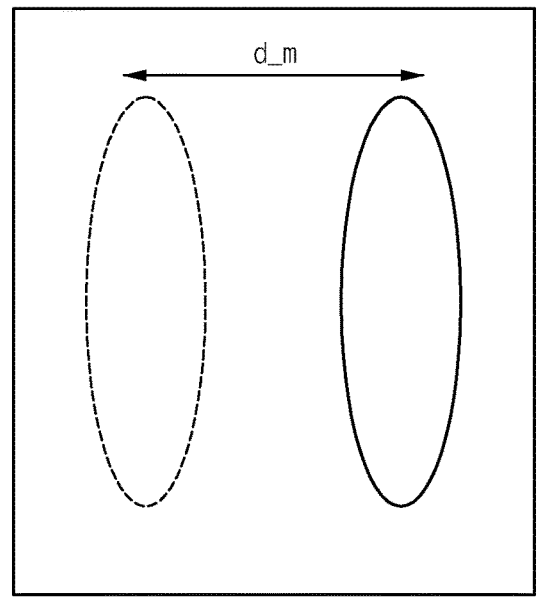
Figure 4A:
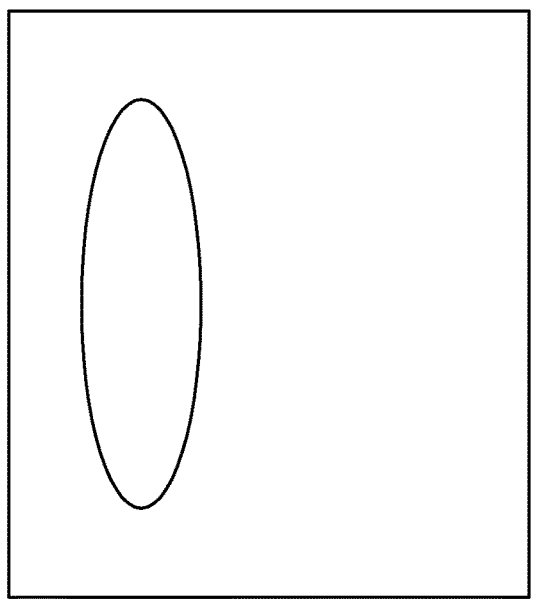
FIGS. 4A, 4B and 4C are diagrams for illustrating 3D depth.
Figure 4A:
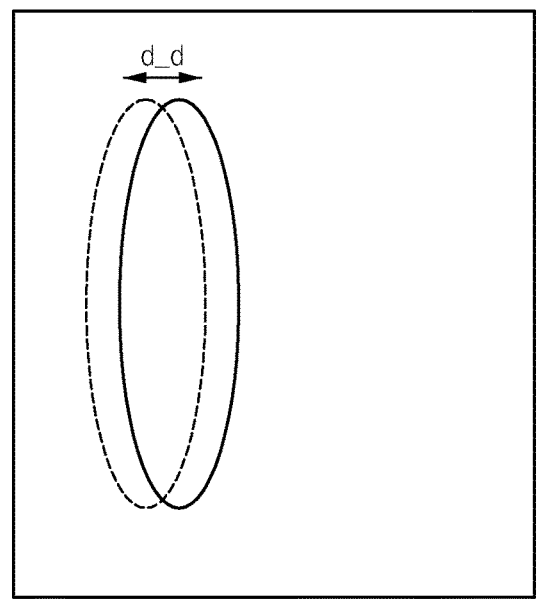
Figure 4B:
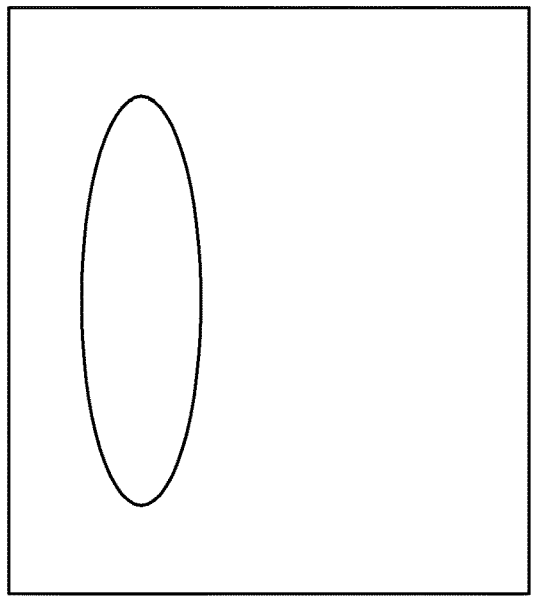
Figure 4B:
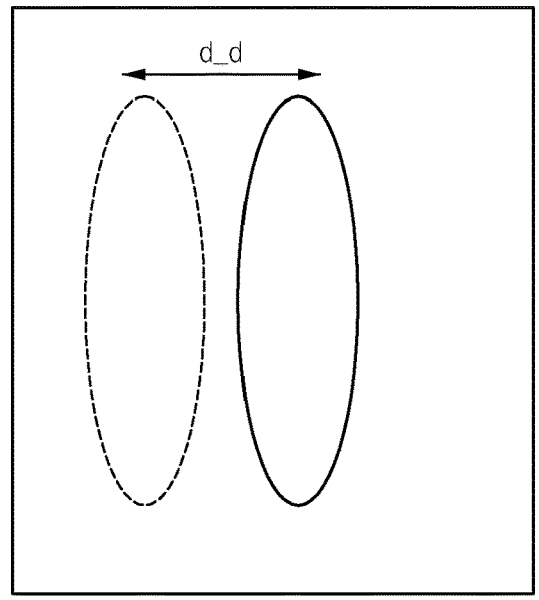
Figure 4C:
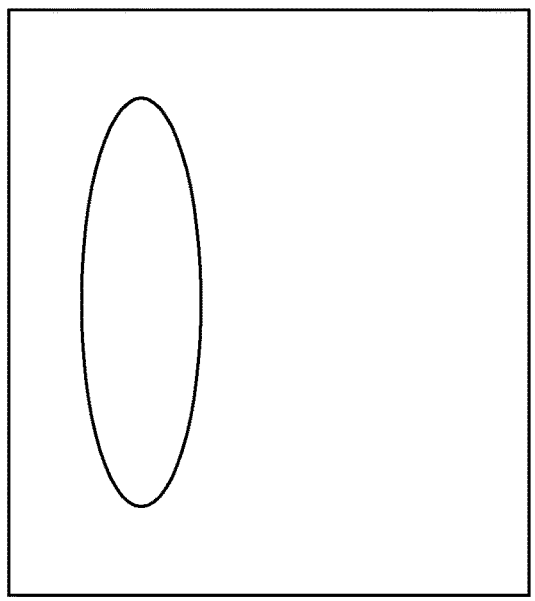
Figure 4C:
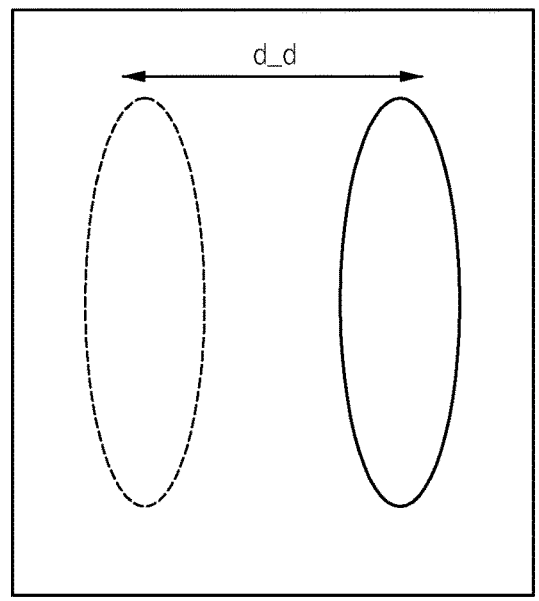

FIGS. 3A to 3C are diagrams for illustrating image motion. FIGS. 4A to 4C are diagrams for illustrating 3D depth.

As shown in FIG. 3A, a distance d_m between an object in a left eye image of the N-1-th frame and an object in a left eye image of the N-th frame may be short, and movement of the left eye image of the N-th frame may be small. As shown in FIG. 3B, the distance d_m between the object in the left eye image of the N-1-th frame and the object in the left eye image of the N-th frame may be longer than in FIG. 3A, and the movement of the left eye image of the N-th frame may be greater than in FIG. 3A. As shown in FIG. 3C, the distance d_m between the object in the left eye image of the N-1-th frame and the object in the left eye image of the N-th frame may be longer than in FIGS. 3A and 3B, and the movement of the left eye image of the N-th frame may be greater than in FIGS. 3A and 3B.

As shown in FIG. 4A, a distance d_d between the object in the left eye image of the N-th frame and an object in a right eye image of the N-th frame may be short, and 3D depth of the N-th frame may be small. As shown in FIG. 4B, the distance d_d between the object in the left eye image of the N-th frame and the object in the right eye image of the N-th frame may be longer than in FIG. 4A, and the 3D depth of the N-th frame may be greater than in FIG. 4A. As shown in FIG. 4C, the distance d_d between the object in the left eye image of the N-th frame and the object in the right eye image of the N-th frame may be greater than in FIGS. 4A and 4B, and the 3D depth of the N-th frame may be greater than in FIGS. 4A and 4B.

FIG. 5 is a diagram for illustrating an operation of converting RGB data into YCoCg data by a first driving controller 422a and a second driving controller 422b.

Referring to FIGS. 1 to 5, the first driving controller 422a may receive the left eye image data LIMG and the second driving controller 422b may receive the right eye image data RIMG. The left eye image data LIMG received from the processor 100 and the right eye image data RIMG received from the processor 100 may be RGB data. The first driving controller 422a may perform RGB-YCoCg conversion on the left eye image data LIMG which is the RGB data to generate YCoCg data including luminance data and chrominance data. Here, Y values may be the luminance data. When an object in an image moves, luminance displayed by each of the pixels P1, P2 included in the display panel 440 may change. Therefore, the image motion and the 3D depth may be determined based on the Y values.

The second driving controller 422b may perform the RGB-YCoCg conversion on the right eye image data RIMG which is the RGB data to generate the YCoCg data including the luminance data and the chrominance data. The YCoCg data may be determined using an equation 300.

$$\begin{bmatrix} Y \\ Co \\ Cg \end{bmatrix} = \begin{bmatrix} \frac{1}{4} & \frac{1}{2} & \frac{1}{4} \\ \frac{1}{2} & 0 & -\frac{1}{2} \\ -\frac{1}{4} & \frac{1}{2} & -\frac{1}{4} \end{bmatrix} \times \begin{bmatrix} R \\ G \\ B \end{bmatrix}$$

In an embodiment, each of R values, G values, and B values may range from 0 to 255. Therefore, range of the Y values may be from 0 to 255. However, the range of the Y values may not be limited to 0 to 255.

Figure 6B:
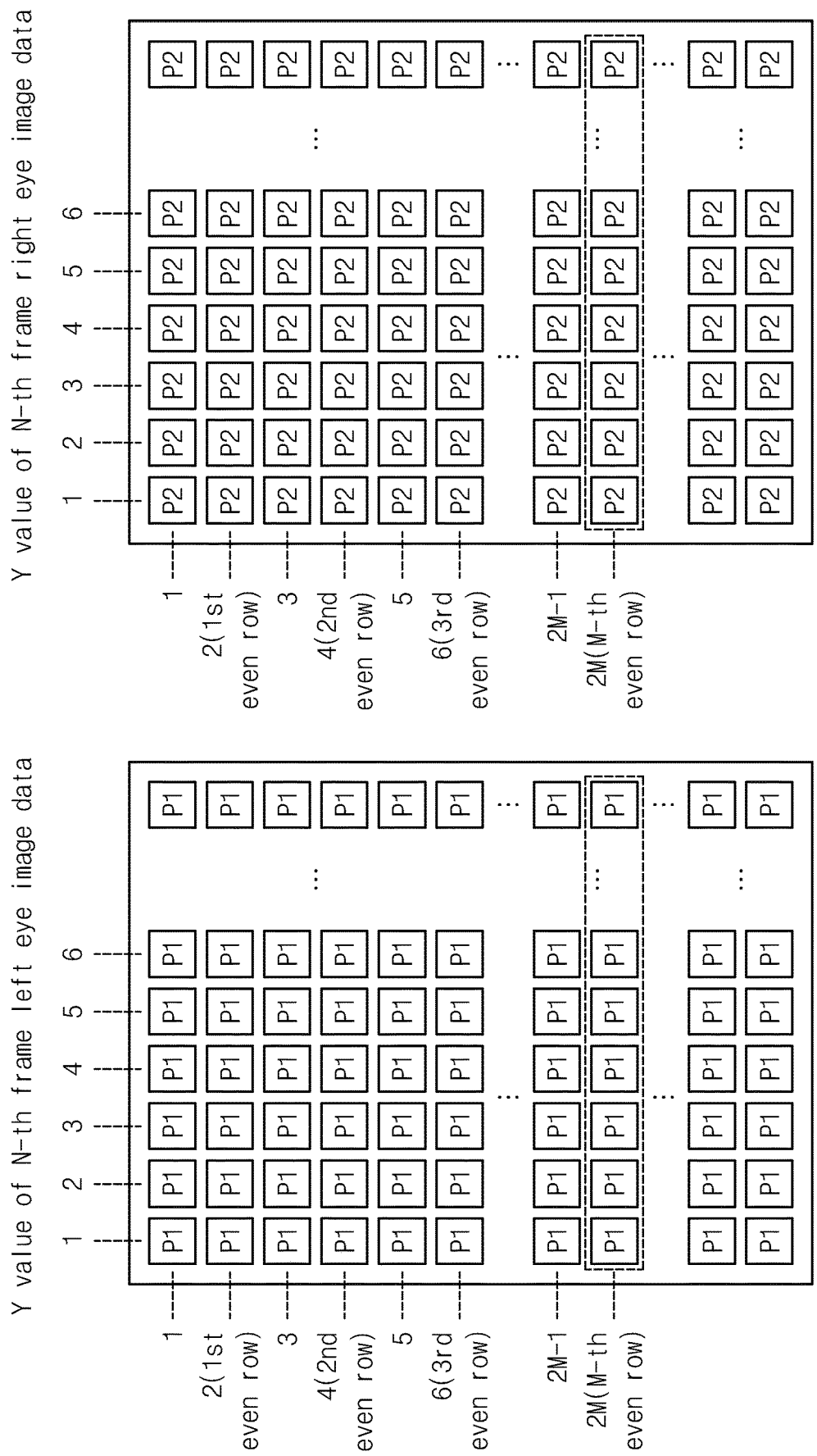
FIG. 6B is a diagram for illustrating the average Y value of the M-th even-numbered pixel row of the N-th frame left eye image data and the average Y value of the M-th even-numbered pixel row of the N-th frame right eye image data in FIG. 6A.

FIG. 6A is a diagram for illustrating an equation (310, 315) for calculating an average Y value YH_NML_EVEN_AVG of an M-th even-numbered pixel row of an N-th frame left eye image data LIMG[N] and an average Y value YH_NMR_EVEN_AVG of an M-th even-numbered pixel row of an N-th frame right eye image data LIMG[N]. FIG. 6B is a diagram for illustrating the average Y value YH_NML_EVEN_AVG of the M-th even-numbered pixel row of the N-th frame left eye image data LIMG[N] and the average Y value YH_NMR_EVEN_AVG of the M-th even-numbered pixel row of the N-th frame right eye image data RIMG[N] in FIG. 6A. FIG. 6C is a diagram for illustrating an example of the average Y value YH_NML_EVEN_AVG of the M-th even-numbered pixel row of the N-th frame left eye image data LIMG[N] and the average Y value YH_NMR_EVEN_AVG of the M-th even-numbered pixel row of the N-th frame right eye image data RIMG[N] in FIG. 6B.

Referring to FIGS. 1 to 6C, in an embodiment, the first driving controller may determine an average Y value YH_NML_EVEN_AVG of an M-th even-numbered pixel row of the N-th frame left eye image data LIMG[N] using an equation 310, that is, "YH_NML_EVEN_AVG=ROUNDUP (YH_NML_EVEN_SUM/N_PH)", and the second driving controller may determine an average Y value YH_NMR_EVEN_AVG of an M-th even-numbered pixel row of the N-th frame right eye image data RIMG[N] using an equation 315, that is, "YH_NMR_EVEN_AVG=ROUNDUP(Y_NMR_EVEN_SUM/N_PH)". Here, YH_NML_EVEN_AVG may be the average Y value of the M-th even-numbered pixel row of the N-th frame left eye image data LIMG[N], ROUNDUP may be a function which rounds up to one decimal place, YH_NML_EVEN_SUM may be a sum of the Y values of the M-th even-numbered pixel row of the N-th frame left eye image data LIMG[N], N_PH may be a number of columns of the first pixels P1 and the second pixels P2, YH_NMR_EVEN_AVG may be the average Y value of the M-th even-numbered pixel row of the N-th frame right eye image data RIMG[N], and YH_NMR_EVEN_SUM may be a sum of the Y values of the M-th even-numbered pixel row of the N-th frame right eye image data RIMG[N].

For example, as shown in FIG. 6C, YH_N−12L_EVEN_SUM=156+119+180+75+228=758, N_PH=5, and YH_N−12L_EVEN=758/5=151.6. For example, as shown in FIG. 6C, YH_N−14L_EVEN_SUM=235+64+91+67+136=593, N_PH=5, and YH_N−14L_EVEN=593/5=118.6.

For example, as shown in FIG. 6C, YH_N2L_EVEN_SUM=24+59+251+68+111=513, N_PH=5, and YH_N2L_EVEN_AVG=513/5=102.6. For example, as shown in FIG. 6C, YH_N4L_EVEN_SUM=138+129+102+127+233=729, N_PH=5, and YH_N4L_EVEN_AVG=729/5=145.8.

For example, as shown in FIG. 6C, YH_N2R_EVEN_SUM=193+85+17+246+136=677, N_PH=5, and YH_N2R_EVEN_AVG=677/5=135.4. For example, as shown in FIG. 6C, YH_N4R_EVEN_SUM=170+76+224+4+134=608, N_PH=5, and YH_N4R_EVEN_AVG=608/5=121.6.

Figure 7B:
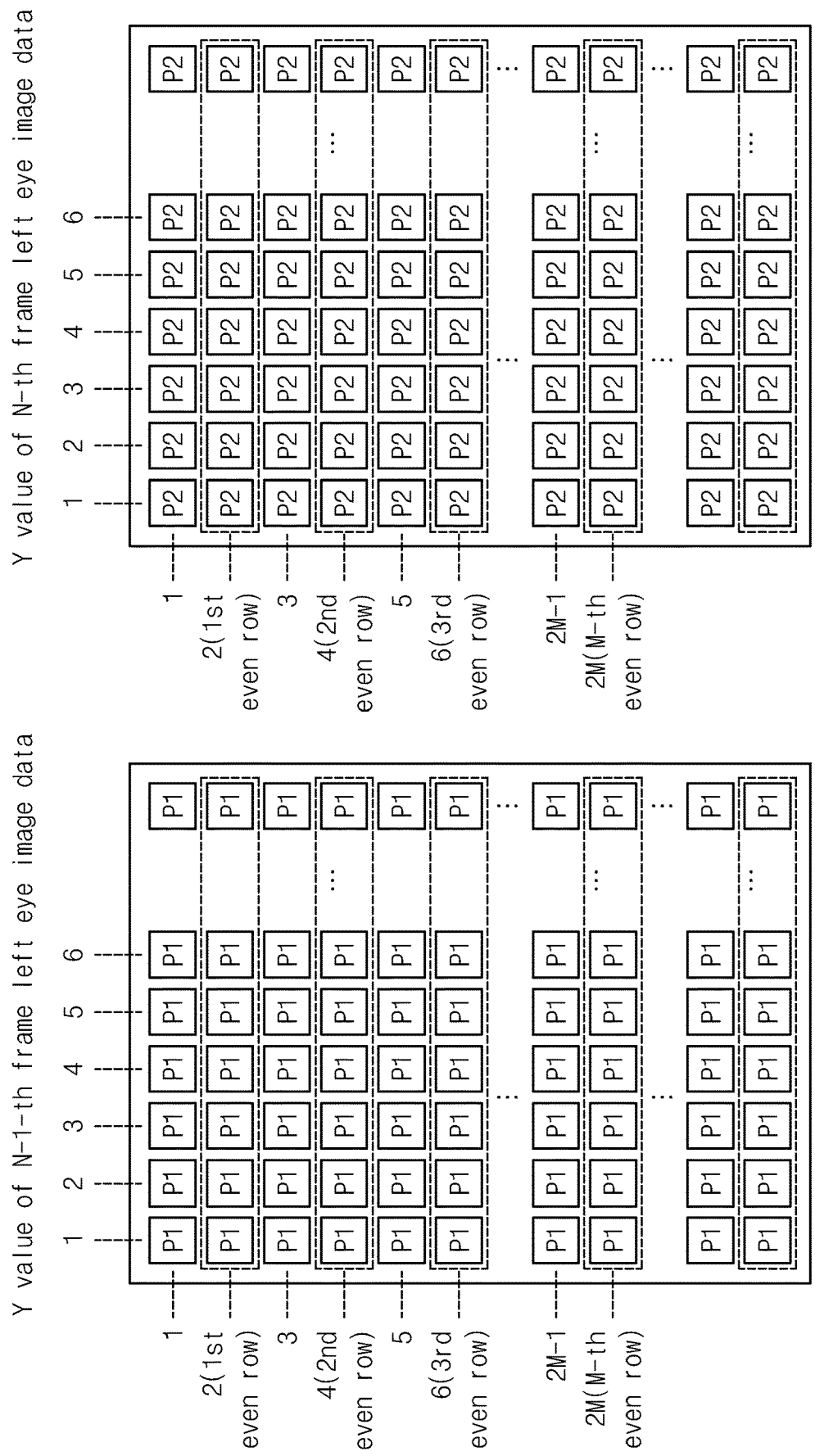
FIG. 7B is a diagram for illustrating the image motion value of the N-th frame left eye image data in FIG. 7A.

FIG. 7A is a diagram for illustrating an equation 320 for calculating an image motion value Y_NL_MOVE of an N-th frame left eye image data LIMG[N]. FIG. 7B is a diagram for illustrating the image motion value Y_NL_MOVE of the N-th frame left eye image data LIMG[N] in FIG. 7A. FIG. 7C is a diagram for illustrating an example of the image motion value Y_NL_MOVE of the N-th frame left eye image data LIMG[N] in FIG. 7B.

Referring to FIGS. 1 to 7C, in an embodiment, the image motion value may be determined based on a difference between previous frame data of the left eye image and current frame data of the left eye image or a difference between previous frame data of the right eye image and current frame data of the right eye image. The first driving controller 422a may determine an image motion value Y_NL_MOVE of the N-th frame left eye image data LIMG[N] based on an average Y value YH_N−1ML_EVEN_AVG of an M-th even-numbered pixel row of the N−1-th frame left eye image data LIMG[N−1] and the average Y value YH_NML_EVEN_AVG of the M-th even-numbered pixel row of the N-th frame left eye image data LIMG[N]. The first driving controller 422a may determine the image motion value Y_NL_MOVE of the N-th frame left eye image data LIMG[N] using an equation 320, that is, "Y_NL_MOVE=ROUNDUP{SUM(|YH_NML_EVEN_AVG−YH_N−1ML_EVEN_AVG|)/(N_PV*0.5)}". Here, Y_NL_MOVE may be the image motion value of the N-th frame left eye image data LIMG[N], ROUNDUP may be the function which rounds up to one decimal place, SUM may be the function which calculates a sum value, YH_NML_EVEN_AVG may be the average Y value of the M-th even-numbered pixel row of the N-th frame left eye image data LIMG[N], YH_N−1ML_EVEN_AVG may the average Y value of the M-th even-numbered pixel row of the N−1-th frame left eye image data LIMG[N−1], and N_PV may be a number of rows of the first pixels P1 and the second pixels P2.

SUM (|YH_NML_EVEN_AVG−YH_N−1ML_EVEN_AVG|) may be a sum of differences of the average Y value YH_NML_EVEN_AVG of the M-th even-numbered pixel row of the N-th frame left eye image data LIMG[N] and the average Y value YH_N−1ML_EVEN_AVG of the M-th even-numbered pixel row of the N−1-th frame left eye image data LIMG[N−1]. For example, SUM (|YH_NML_EVEN_AVG−YH_N−1ML_EVEN_AVG|) may be the sum of the differences of the average Y value YH_NML_EVEN_AVG of the M-th even-numbered pixel row of the N-th frame left eye image data LIMG[N] and the average Y value YH_N−1ML_EVEN_AVG of the M-th even-numbered pixel row of the N−1-th frame left eye image data LIMG[N−1] for all even-numbered pixel rows. N_PV*0.5 may be a number of all even-numbered pixel rows. Therefore, Y_NL_MOVE may be the image motion value Y_NL_MOVE of the N-th frame left eye image data LIMG[N].

For example, as shown in FIG. 7C, |YH_N2L_EVEN_AVG−YH_N−12L_EVEN_AVG|=|(24+59+251+68+111)/5−(156+119+180+75+228)/5|=|102.6−151.6|=49 and |YH_N4L_EVEN_AVG−YH_N−14L_EVEN_AVG|=|(138+128+102+127+233)/5−(235+64+91+67+136)/5|=|145.8−118.6|=27.2. For example, as shown in FIG. 7C, SUM(|YH_NML_EVEN_AVG−YH_N−1ML_EVEN_AVG|)=49+27.2=76.2, and ROUNDUP(SUM(|YH_NML_EVEN_AVG−YH_N−1ML_EVEN_AVG|))=ROUNDUP(76.2)=77. In this case, the image motion value Y_NL_MOVE of the N-th frame left eye image data LIMG[N] may be 77.

The first driving controller 422a may transfer the average Y value YH_NML_EVEN_AVG of the M-th even-numbered pixel row of the N-th frame left eye image data LIMG[N] and the image motion value Y_NL_MOVE of the N-th frame left eye image data LIMG[N] to the processor 100. The second driving controller 422b may transfer the average Y value YH_NMR_EVEN_AVG of the M-th even-numbered pixel row of the N-th frame right eye image data RIMG[N] to the processor 100.

Figure 8B:
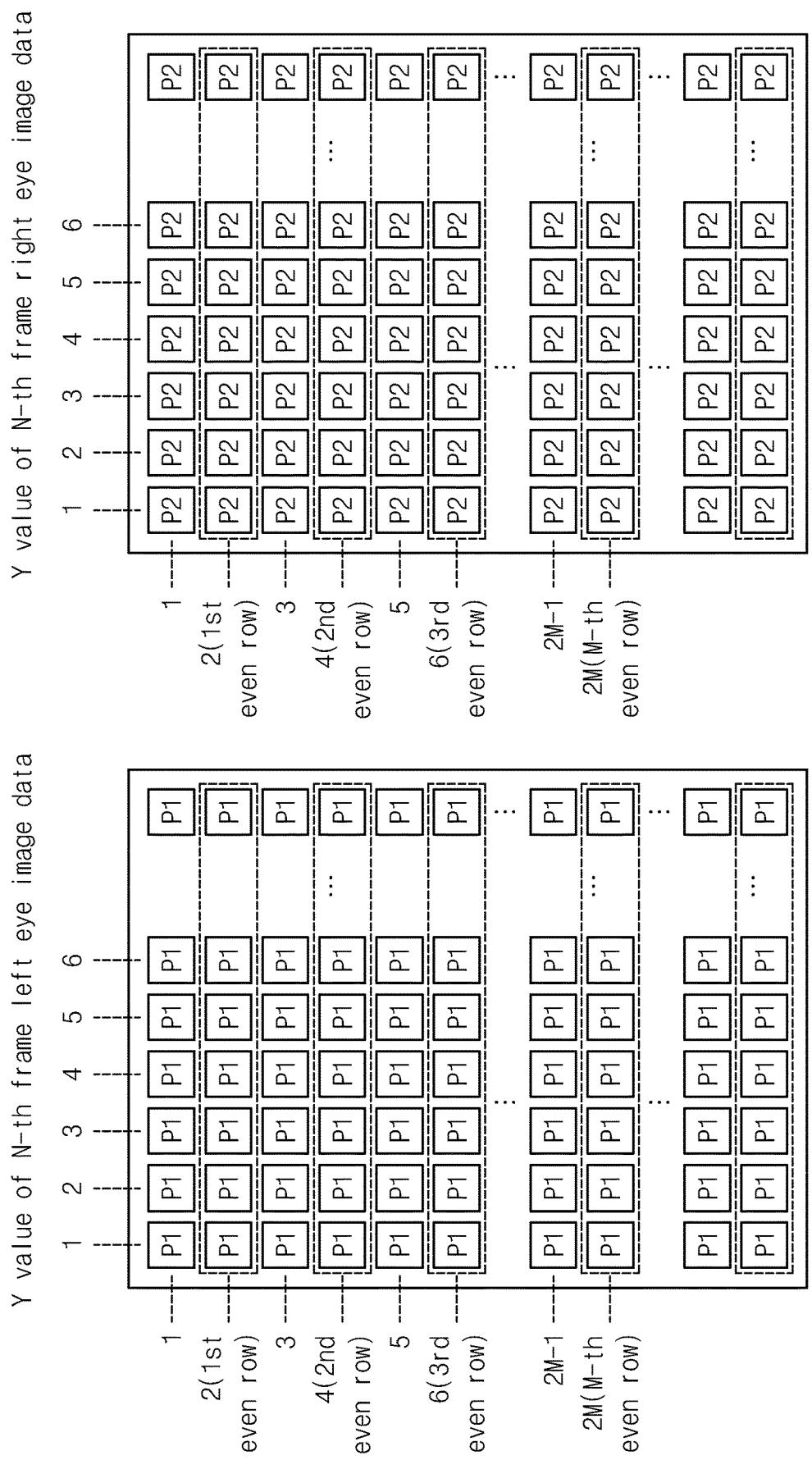
FIG. 8B is a diagram for illustrating the 3D depth value of the N-th frame left eye image data and the N-th frame right eye image data in FIG. 8A.

FIG. 8A is a diagram for illustrating an equation 330 for calculating a 3D depth value Y_N_DEPTH of an N-th frame left eye image data LIMG[N] and an N-th frame right eye image data RIMG[N]. FIG. 8B is a diagram for illustrating the 3D depth value Y_N_DEPTH of the N-th frame left eye image data LIMG[N] and the N-th frame right eye image data RIMG[N] in FIG. 8A. FIG. 8C is a diagram for illustrating an example of the 3D depth value Y_N_DEPTH of the N-th frame left eye image data LIMG[N] and the N-th frame right eye image data RIMG[N] in FIG. 8B.

Referring to FIGS. 1 to 8C, in an embodiment, a 3D depth value may be determined based on a difference between the current frame data of the left eye image and the current frame data of the right eye image. The processor 100 may determine a 3D depth value of the N-th frame left eye image data LIMG[N] and the N-th frame right eye image data RIMG[N] based on the average Y value YH_NML_EVEN_AVG of the M-th even-numbered pixel row of the N-th frame left eye image data LIMG[N] and the average Y value YH_NMR_EVEN_AVG of the M-th even-numbered pixel row of the N-th frame right eye image data RIMG[N]. The processor 100 may determine the 3D depth value Y_N_DEPTH of the N-th frame left eye image data LIMG[N] and the N-th frame right eye image data RIMG[N] using an equation 330, that is, "Y_N_DEPTH=ROUNDUP{SUM(|YH_NML_EVEN_AVG−YH_NMR_EVEN_AVG|)/(N_PV*0.5)}". Here, Y_N_DEPTH may be the 3D depth value of the N-th frame left eye image data LIMG[N] and the N-th frame right eye image data RIMG[N], ROUNDUP may be the function which rounds up to one decimal place, and SUM may be a function which calculates a sum value, YH_NML_EVEN_AVG may be the average Y value of the M-th even-numbered pixel row of the N-th frame left eye image data LIMG[N], and YH_NMR_EVEN_AVG may be the average Y value of the M-th even-numbered pixel row of the N-th frame right eye image data RIMG[N], and N_PV may be the number of rows of the first pixels P1 and the second pixels P2.

For example, as shown in FIG. 8C, |YH_N2L_EVEN_AVG−YH_N2R_EVEN_AVG|=|102.6−135.4|=32.8, |YH_N4L_EVEN_AVG−YH_N4R_EVEN_AVG|=|145.8−121.6|=24.2, and N_PV*0.5=4*0.5=2. For example, as shown in FIG. 8C, SUM(|YH_NML_EVEN_AVG−YH_NMR_EVEN_AVG|)=32.8+24.2=57, and ROUNDUP{SUM(|YH_NML_EVEN_AVG−YH_NMR_EVEN_AVG|)/(N_PV*0.5)}=ROUNDUP(57/2)=ROUNDUP(28.5)=29. In this case, the 3D depth value Y_N_DEPTH of the N-th frame left eye image data LIMG[N] and the N-th frame right eye image data RIMG[N] may be 29.

In short, the image motion value Y_NL_MOVE of the N-th frame left eye image data LIMG[N] may be 77, and the 3D depth value Y_N_DEPTH of the N-th frame left eye image data LIMG[N] and the N-th frame right eye image data RIMG[N] may be 29.

In an embodiment, the processor 100 may determine the 2D image mode or the 3D image mode based on the image motion value Y_NL_MOVE of the N-th frame left eye image data LIMG[N], and the 3D depth value Y_N_DEPTH of the N-th frame left eye image data LIMG[N] and the N-th frame right eye image data RIMG[N]. Specifically, when the image motion value Y_NL_MOVE of the N-th frame left eye image data LIMG[N] is greater than a motion threshold value MOVE_TH and the 3D depth value of the N-th frame left eye image data LIMG[N] and the N-th frame right eye image data RIMG[N] is greater than a depth threshold value DEPTH_TH, the processor 100 may determine the 2D image mode. When the processor 100 determines the 2D image mode, the processor 100 may identically provide the left eye image data LIMG and the right eye image data RIMG to the first driving controller 422a and the second driving controller 422b.

Specifically, when the image motion value Y_NL_MOVE of the N-th frame left eye image data LIMG[N] is less than or equal to the motion threshold value MOVE_TH or the 3D depth value of the N-th frame left eye image data LIMG[N] and the N-th frame right eye image data RIMG[N] is less than or equal to the depth threshold value DEPTH_TH, the processor 100 may determine the 3D image mode. When the processor 100 determines the 3D image mode, the processor 100 may differently provide the left eye image data LIMG and the right eye image data RIMG to the first driving controller 422a and the second driving controller 422b, respectively.

In an embodiment, the processor 100 may determine the 2D image mode or the 3D image mode based on the image motion value Y_NL_MOVE of the N-th frame left eye image data LIMG[N], the 3D depth value Y_N_DEPTH of the N-th frame left eye image data LIMG[N] and the N-th frame right eye image data RIMG[N], and a duration time. The duration time may be a time when the image motion value Y_NL_MOVE of the N-th frame left eye image data LIMG[N] is greater than the motion threshold value MOVE_TH and the 3D depth value Y_N_DEPTH of the N-th frame left eye image data LIMG[N] and the N-th frame right eye image data RIMG[N] is greater than the depth threshold value DEPTH_TH. Specifically, when the image motion value Y_NL_MOVE of the N-th frame left eye image data LIMG[N] is greater than the motion threshold value MOVE_TH, the 3D depth value of the N-th frame left eye image data LIMG[N] and the N-th frame right eye image data RIMG[N] is greater than the depth threshold value DEPTH_TH, and the duration time is greater than a duration time threshold value, the processor 100 may determine the 2D image mode.

As such, the electronic device 1000 may operate in the 2D image mode in which the left eye image and the right eye image are identically displayed based on the image motion value Y_NL_MOVE and the 3D depth value Y_N_DEPTH or operate in the 3D image mode in which the left eye image and the right eye image are differently displayed based on the image motion value Y_NL_MOVE and the 3D depth value Y_N_DEPTH, so that a user's dizziness may be relieved.

Figure 9B:
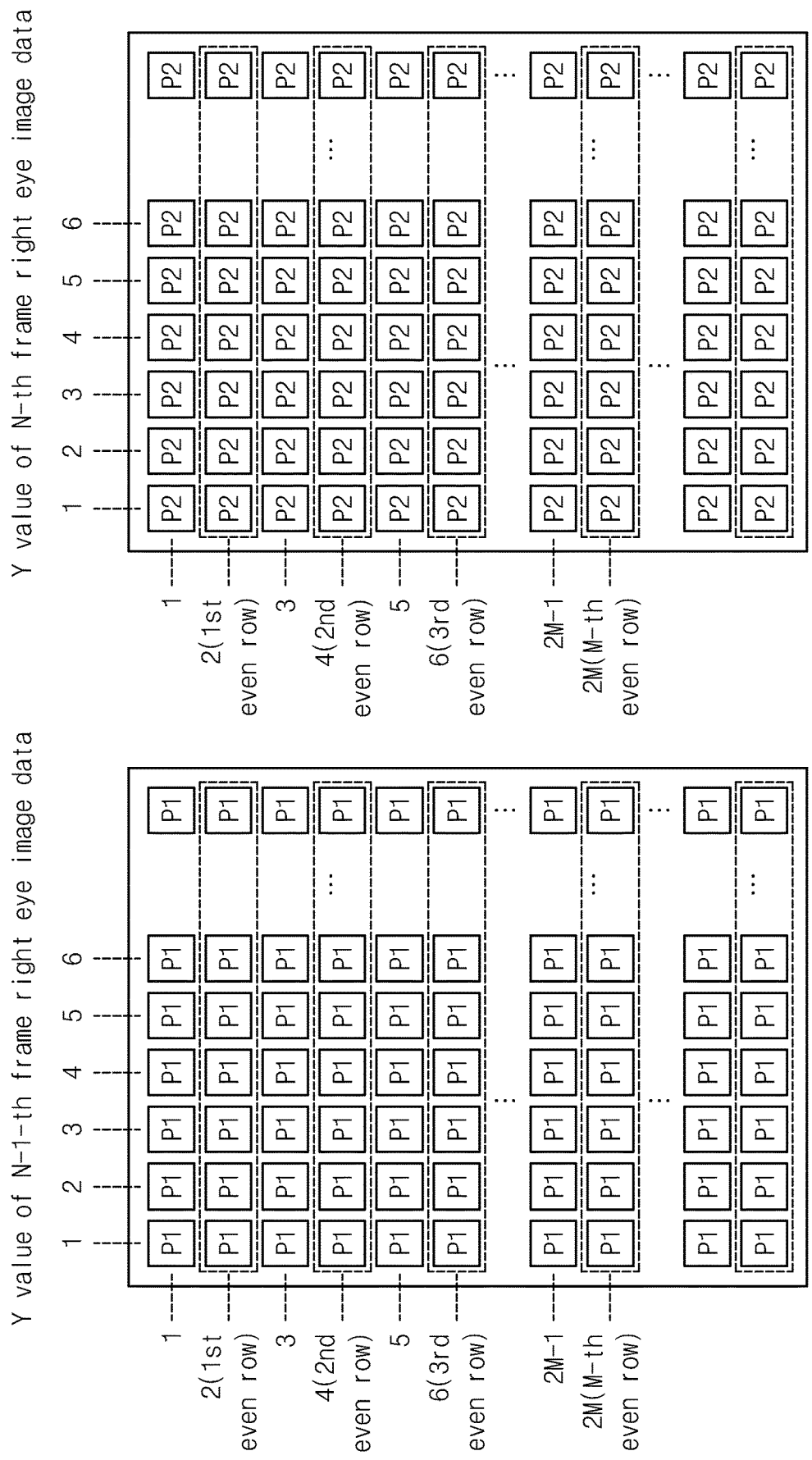
FIG. 9B is a diagram for illustrating the image motion value of the N-th frame right eye image data in FIG. 9A.

FIG. 9A is a diagram for illustrating an equation 340 for calculating an image motion value Y_NR_MOVE of N-th frame right eye image data RIMG[N]. FIG. 9B is a diagram for illustrating the image motion value Y_NR_MOVE of the N-th frame right eye image data RIMG[N] in FIG. 9A.

Referring to FIGS. 1 to 9B, in an embodiment, the second driving controller 422b may determine an image motion value Y_NR_MOVE of the N-th frame right eye image data RIMG[N] based on an average Y value YH_N−1MR_EVEN_AVG of M-th even-numbered pixel row of N−1-th frame right eye image data RIMG[N−1] and the average Y value YH_NMR_EVEN_AVG of the M-th even-numbered pixel row of the N-th frame right eye image data RIMG[N]. The second driving controller 422b may determine the image motion value Y_NR_MOVE of the N-th frame right eye image data RIMG[N] using an Equation 340, that is, "Y_NR_MOVE=ROUNDUP{SUM(|YH_NMR_EVEN_AVG−YH_N−1MR_EVEN_AVG|)/(N_PV*0.5)}". Here, Y_NR_MOVE may be the image motion value of the N-th frame right eye image data RIMG[N], ROUNDUP may be the function which rounds up to one decimal place, and SUM may be the function which calculates a sum value, YH_NMR_EVEN_AVG may be the average Y value of the M-th even-numbered pixel row of the N-th frame right eye image data RIMG[N], and YH_N−1MR_EVEN_AVG is the average Y value of the M-th even-numbered pixel row of the N−1-th frame right eye image data RIMG[N−1], and N_PV may be the number of rows of the first pixels P1 and the second pixels P2.

A method of determining the image motion value Y_NR_MOVE of the N-th frame right eye image data RIMG[N] in FIGS. 9A and 9B may be substantially equal to a method of determining the image motion value Y_NL_MOVE of the N-th frame left eye image data LIMG[N] in FIGS. 7A and 7B except for using the right eye image data RIMG. Therefore, redundant descriptions of the same or corresponding components will be omitted.

The processor 100 may determine the 2D image mode or the 3D image mode based on the image motion value Y_NR_MOVE of the N-th frame right eye image data RIMG[N], the 3D depth value Y_N_DEPTH of the N-th frame left eye image data LIMG[N] and the N-th frame right eye image data RIMG[N] and the duration time.

As such, the electronic device 1000 may operate in the 2D image mode in which the left eye image and the right eye image are identically displayed based on the image motion value Y_NR_MOVE and the 3D depth value Y_N_DEPTH or operate in the 3D image mode in which the left eye image and the right eye image are differently displayed based on the image motion value Y_NR_MOVE and the 3D depth value Y_N_DEPTH, so that the user's dizziness may be relieved.

Figure 10B:
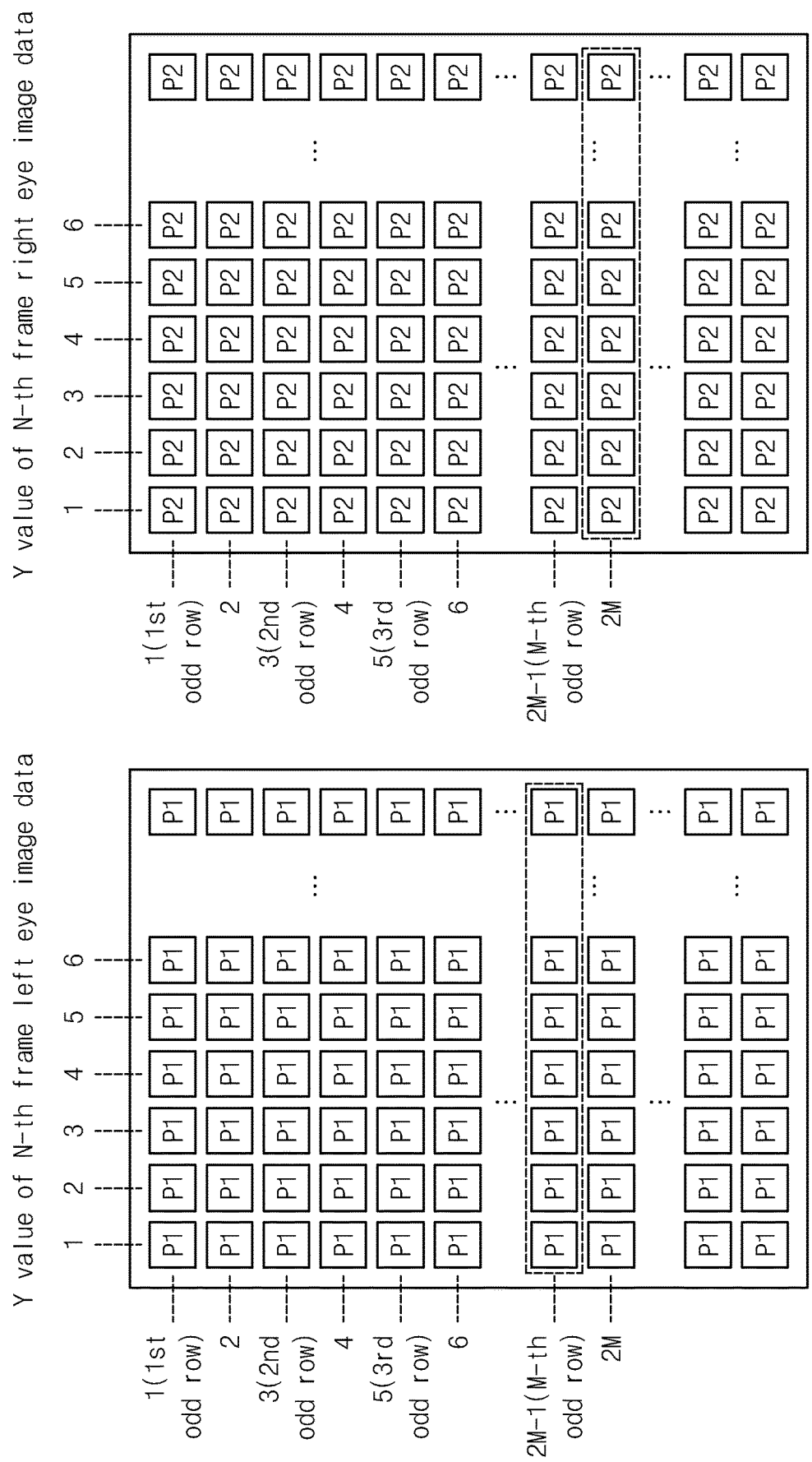
FIG. 10B is a diagram for illustrating the average Y value of the M-th odd-numbered pixel row of the N-th frame left eye image data and the average Y value of the M-th odd-numbered pixel row of the N-th frame right eye image data in FIG. 10A.

FIG. 10A is a diagram for illustrating an equation (350, 355) for calculating an average Y value YH_NML_ODD_AVG of an M-th odd-numbered pixel row of an N-th frame left eye image data LIMG[N] and an average Y value YH_NMR_ODD_AVG an M-th odd-numbered pixel row of an N-th frame right eye image data RIMG[N]. FIG. 10B is a diagram for illustrating the average Y value of the M-th odd-numbered pixel row of the N-th frame left eye image data and the average Y value of the M-th odd-numbered pixel row of the N-th frame right eye image data in FIG. 10A.

Referring to FIGS. 1 to 10B, in an embodiment, the first driving controller 422a may determine an average Y value YH_NML_ODD_AVG of an M-th odd-numbered pixel row of the N-th frame left eye image data LIMG[N] using an Equation 350, that is, "YH_NML_ODD_AVG=ROUNDUP (YH_NML_ODD_SUM/N_PH)", and the second driving controller 422b may determine an average Y value YH_NMR_ODD_AVG of the M-th odd-numbered pixel row of the N-th frame right eye image data RIMG[N] using an Equation 355, that is, "YH_NMR_ODD_AVG=ROUNDUP (Y_NMR_ODD_SUM/N_PH)". Here, YH_NML_ODD_AVG may be the average Y value of the M-th odd-numbered pixel row of the N-th frame left eye image data LIMG[N], ROUNDUP may be the function which rounds up to one decimal place, and YH_NML_ODD_SUM is a sum of the Y values of the M-th odd-numbered pixel row of the N-th frame left eye image data LIMG[N], N_PH may be a number of columns of the first pixels P1 and the second pixels P2, YH_NMR_ODD_AVG may be the average Y value of the M-th odd-numbered pixel row of the N-th frame right eye image data RIMG[N], and YH_NMR_ODD_SUM may be a sum of the Y values of the M-th odd-numbered pixel row of the N-th frame right eye image data RIMG[N].

Figure 11B:
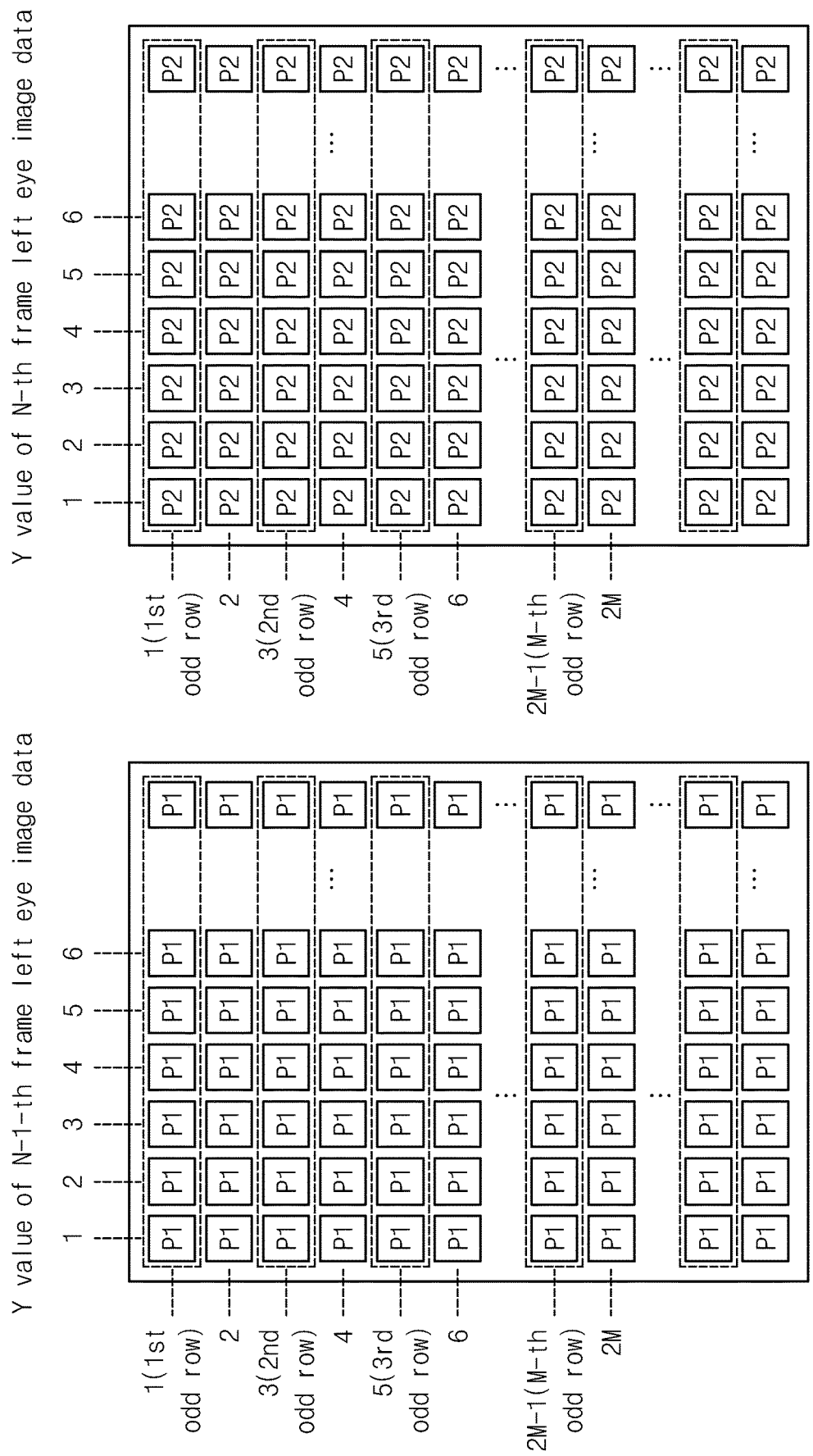
FIG. 11B is a diagram for illustrating the image motion value of the N-th frame left eye image data in FIG. 11A.

FIG. 11A is a diagram for illustrating an equation 360 for calculating an image motion value Y_NL_MOVE of an N-th frame left eye image data LIMG[N]. FIG. 11B is a diagram for illustrating the image motion value Y_NL_MOVE of the N-th frame left eye image data LIMG[N] in FIG. 11A.

Referring to FIGS. 1 to 11B, the first driving controller 422a may determine the image motion value Y_NL_MOVE of the N-th frame left eye image data LIMG[N] based on an average Y value YH_N−1ML_ODD_AVG of an M-th odd-numbered pixel row of the N−1-th frame left eye image data LIMG[N−1] and the average Y value YH_NML_ODD_AVG of the M-th odd-numbered pixel row of the N-th frame left eye image data LIMG[N]. The first driving controller 422a may determine the image motion value Y_NL_MOVE of the N-th frame left eye image data LIMG[N] using an Equation 360, that is, "Y_NL_MOVE=ROUNDUP{SUM(|YH_NML_ODD_AVG−YH_N−1ML_ODD_AVG|)/(N_PV*0.5)}". Here, Y_NL_MOVE may be the image motion value of the N-th frame left eye image data LIMG[N], ROUNDUP may be the function which rounds up to one decimal place, SUM may be the function which calculates a sum value, YH_NML_ODD_AVG may the average Y value of the M-th odd-numbered pixel row of the N-th frame left eye image data LIMG[N], YH_N−1ML_ODD_AVG may be the average Y value of the M-th odd-numbered pixel row of the N−1th frame left eye image data LIMG[N−1], and N_PV may be the number of rows of the first pixels P1 and the second pixels P2.

Figure 12B:
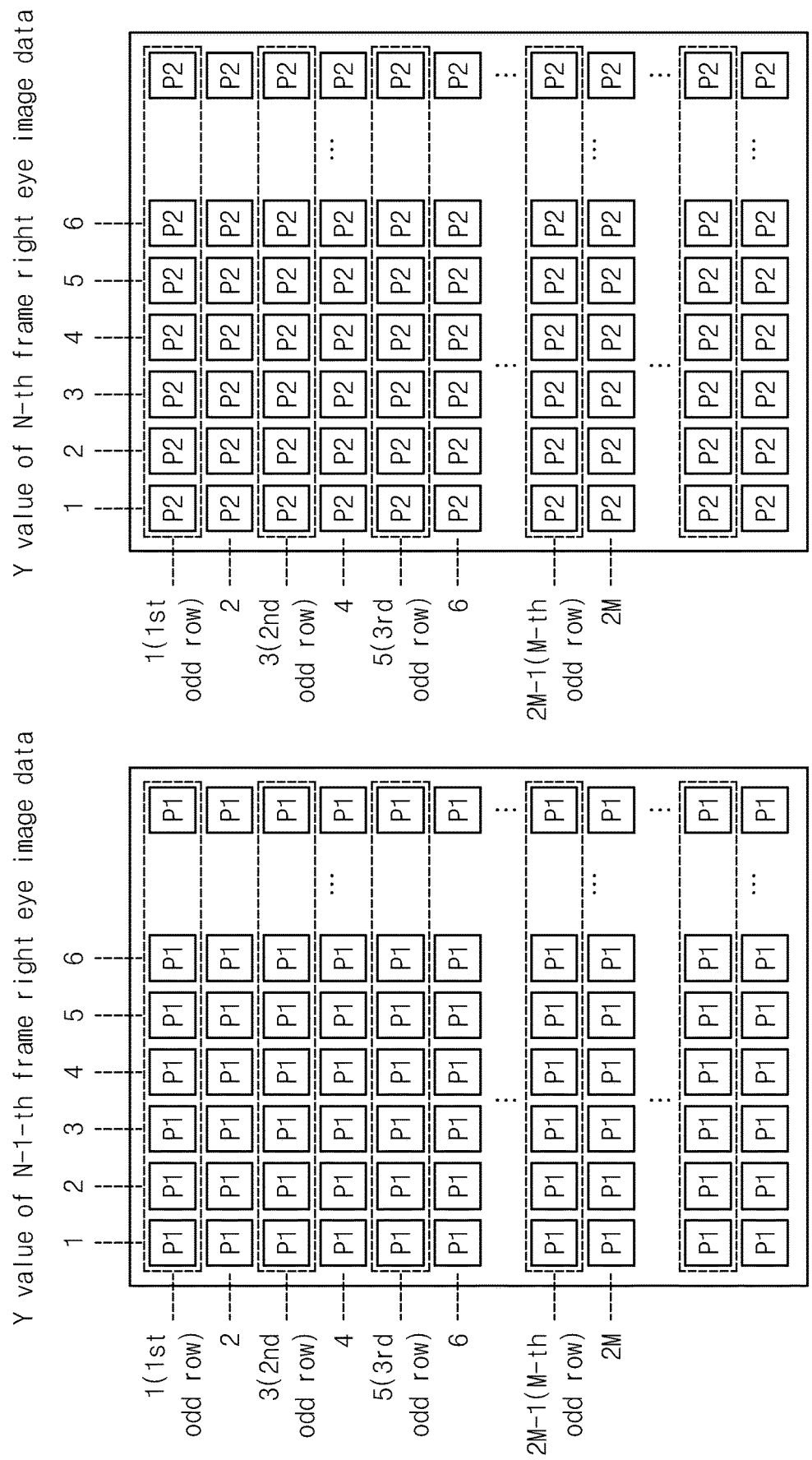
FIG. 12B is a diagram for illustrating the image motion value of the N-th frame right eye image data in FIG. 12A.

FIG. 12A is a diagram for illustrating an equation 370 for calculating an image motion value Y_NR_MOVE of an N-th frame right eye image data RIMG[N]. FIG. 12B is a diagram for illustrating the image motion value Y_NR_MOVE of the N-th frame right eye image data RIMG[N] in FIG. 12A.

Referring to FIGS. 1 to 12B, in an embodiment, the second driving controller 422b may determine the image motion value Y_NR_MOVE of the N-th frame right eye image data RIMG[N] based on an average value YH_N−1MR_ODD_AVG of Y values of an M-th odd-numbered pixel row of the N−1-th frame right eye image data RIMG[N−1] and the average Y value of the M-th odd-numbered pixel row of the N-th frame right eye image data RIMG[N]. The second driving controller 422b may determine the image motion value Y_NR_MOVE of the N-th frame right eye image data RIMG[N] using an Equation 370, that is, "Y_NR_MOVE=ROUNDUP{SUM(|YH_NMR_OD-D_AVG−YH_N−1MR_ODD_AVG|)/(N_PV*0.5)}". Here, Y_NR_MOVE may be the image motion value of the N-th frame right eye image data RIMG[N], ROUNDUP may be the function which rounds up to one decimal place, SUM may be the function which calculates a sum value, YH_NMR_ODD_AVG may be the average Y value of the M-th odd-numbered pixel row of the N-th frame right eye image data RIMG[N], YH_N−1MR_ODD_AVG may be the average Y value of the M-th odd-numbered pixel row of the N−1-th frame right eye image data RIMG[N−1], and N_PV may be the number of rows of the first pixels P1 and the second pixels P2.

Figure 13B:
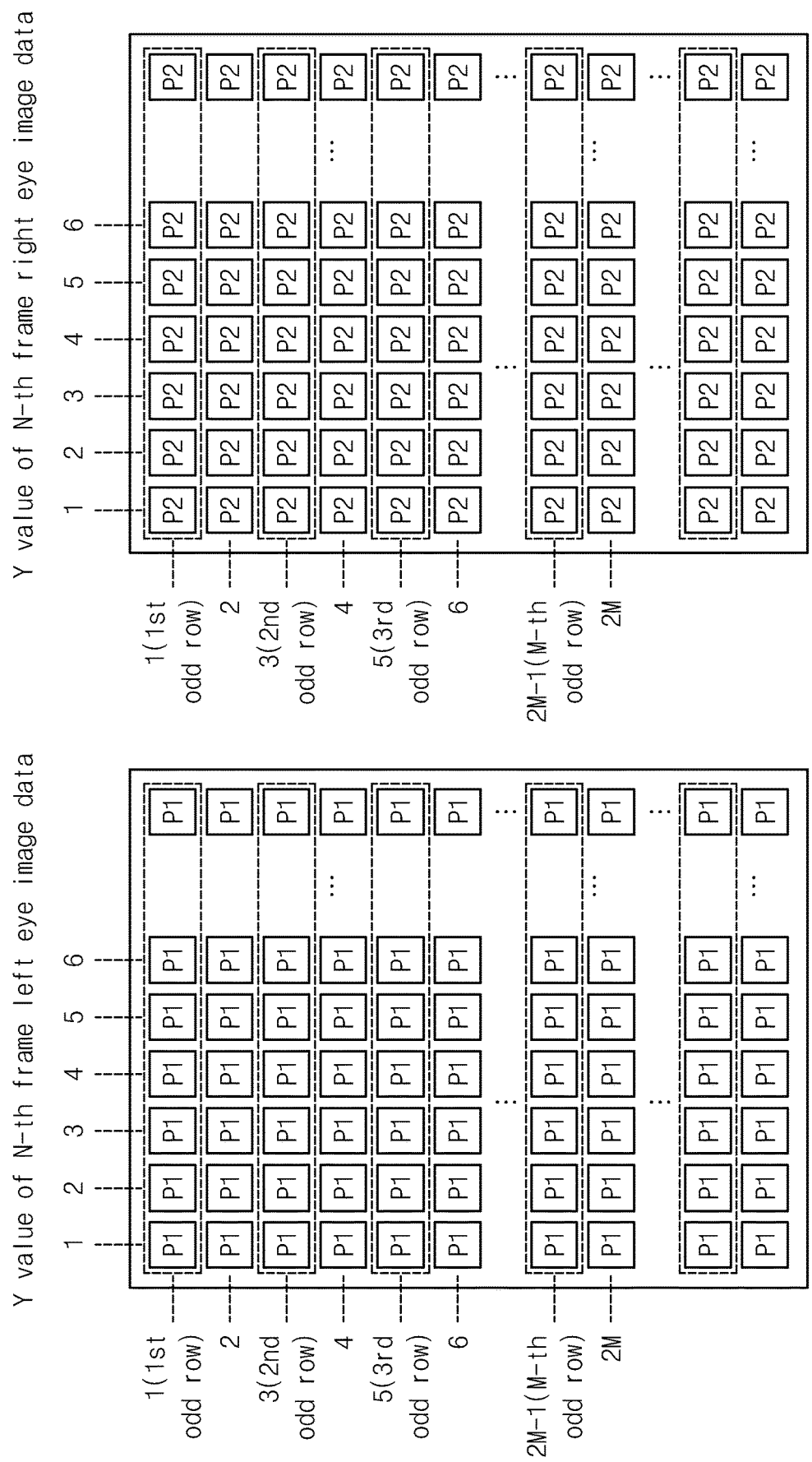
FIG. 13B is a diagram for illustrating the image motion value of the N-th frame right eye image data in FIG. 13A.

FIG. 13A is a diagram for illustrating an equation for calculating 380 an image motion value of an N-th frame right eye image data. FIG. 13B is a diagram for illustrating the image motion value of the N-th frame right eye image data in FIG. 13A.

Referring to FIGS. 1 to 13B, in an embodiment, the processor 100 may determine the 3D depth value Y_N_DEPTH of the N-th frame left eye image data LIMG[N] and the N-th frame right eye image data RIMG[n] based on the average Y value YH_NML_ODD_AVG of the M-th odd-numbered pixel row of the N-th frame left eye image data LIMG[N] and the average value YH_NMR_ODD_AVG of Y values of the M-th odd-numbered pixel row of the N-th frame right eye image data RIMG[N]. The processor 100 may determine the 3D depth value Y_N_DEPTH of the N-th frame left eye image data LIMG[N] and the N-th frame right eye image data RIMG[n] using an Equation 380, that is, "Y_N_DEPTH=ROUNDUP{SUM(|YH_NML_ODD_AVG−YH_NMR_ODD_AVG|)/(N_PV*0.5)}". Here, Y_N_DEPTH may be the 3D depth value of the N-th frame left eye image data LIMG[N] and the N-th frame right eye image data RIMG[N], ROUNDUP may be the function which rounds up to one decimal place, SUM may be the function which calculates a sum value, YH_NML_ODD_AVG may be the average Y value of the M-th odd-numbered pixel row of the N-th frame left eye image data LIMG[N], YH_NMR_ODD_AVG may be the average value of Y values of the M-th odd-numbered pixel row of the N-th frame right eye image data RIMG[N], and N_PV may be the number of rows of the first pixels P1 and the second pixels P2.

As such, the electronic device 1000 may operate in the 2D image mode in which the left eye image and the right eye image are identically displayed based on the image motion value Y_NL_MOVE and the 3D depth value Y_N_DEPTH or operate in the 3D image mode in which the left eye image and the right eye image are differently displayed based on the image motion value Y_NL_MOVE and the 3D depth value Y_N_DEPTH, so that the user's dizziness may be relieved.

In an embodiment, the electronic device 1000 may support a variable frame frequency mode, and the electronic device 1000 may lower driving frequency of the electronic device 1000 when the image motion value Y_NL_MOVE of the N-th frame left eye image data LIMG[N] is greater than the motion threshold value MOVE_TH and the 3D depth value of the N-th frame left eye image data LIMG[N] and the N-th frame right eye image data RIMG[N] is greater than the depth threshold value DEPTH_TH. Accordingly, power consumption of the electronic device 1000 may be reduced.

Figure 14:
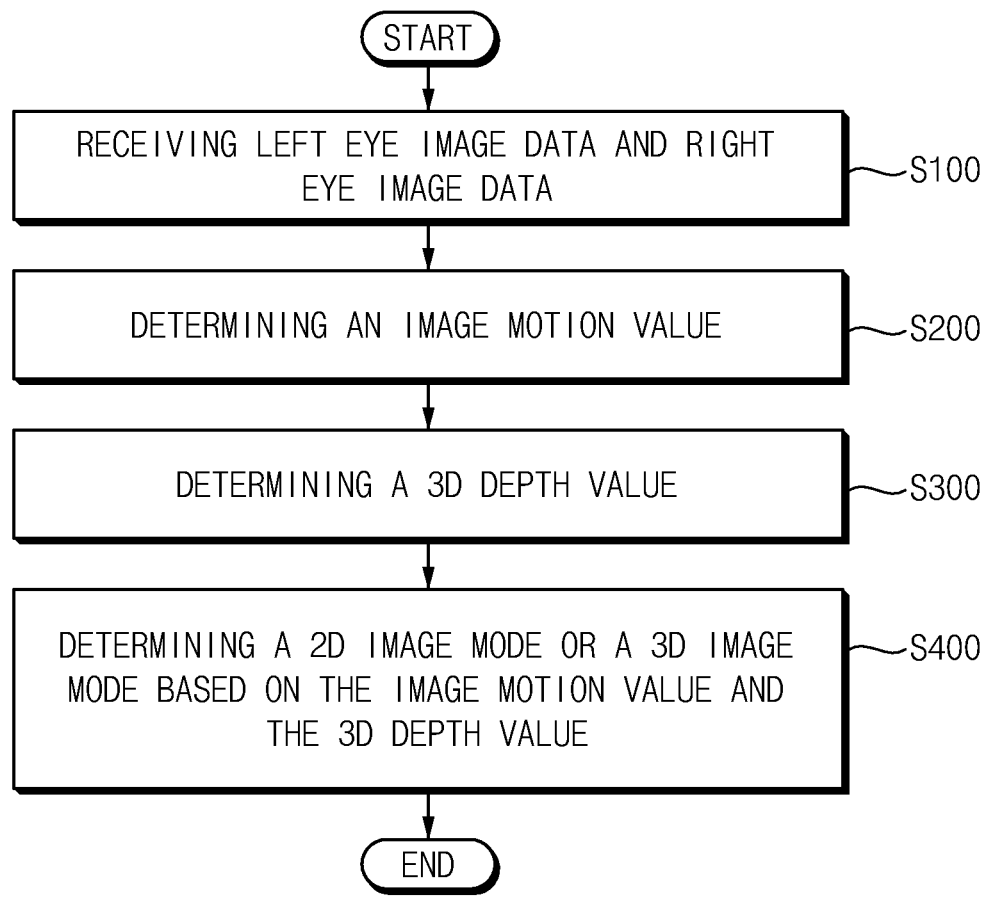
FIG. 14 is a flowchart for illustrating a method of driving the electronic device of FIG. 1 according to embodiments of the present inventive concept.

FIG. 14 is a flowchart for illustrating a method of driving the electronic device 1000 of FIG. 1 according to embodiments of the present inventive concept.

Referring to FIS. 1 to 14, a method of driving the electronic device 1000 may include receiving left eye image data LIMG and right eye image data RIMG S100, determining an image motion value S200, determining a 3D depth value S300, and determining a 2D image mode in which a left eye image and a right eye image are identically displayed or a 3D image mode in which the left eye image and the right eye image are differently displayed based on the image motion value and the 3D depth value S400. In the method described above, the determining of the 3D depth value S300 may be performed before the determining of the image motion value S200, or the determining of the image motion value S200 and the determining of the 3D depth value S300 may be performed at the same time.

The method of driving the electronic device 1000 of FIG. 14 is substantially the same as the electronic device 1000 of FIG. 1. Therefore, redundant descriptions of the same or corresponding components will be omitted.

As such, the method of driving the electronic device 1000 may operate in the 2D image mode in which the left eye image and the right eye image are identically displayed based on the image motion value Y_NL_MOVE and the 3D depth value Y_N_DEPTH or operate in the 3D image mode in which the left eye image and the right eye image are differently displayed based on the image motion value Y_NL_MOVE and the 3D depth value Y_N_DEPTH so that a user's dizziness may be relieved.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:
1. An electronic device comprising:
a first display panel including first pixels which display a left eye image;
a second display panel including second pixels which display a right eye image; and
a display panel driver configured to apply left eye data voltages to the first pixels and to apply right eye data voltages to the second pixels,
wherein the first display panel and the second display panel are configured to operate in a 2D image mode in which the left eye image and the right eye image which are identical to each other are displayed or to operate in a 3D image mode in which the left eye image and the right eye image which are different from each other are displayed based on an image motion value and a 3D depth value, and
wherein, when the image motion value is greater than a motion threshold value, the 3D depth value is greater than a depth threshold value, and a duration time during which the image motion value is greater than the motion threshold value and the 3D depth value is greater than the depth threshold value is greater than a duration time threshold value, the first display panel and the second display panel display in the 2D image mode.

2. The electronic device of claim 1, wherein, when the image motion value is less than or equal to the motion threshold value or the 3D depth value is less than or equal to the depth threshold value, the first display panel and the second display panel display in the 3D image mode.

3. The electronic device of claim 1, wherein, the image motion value is determined based on a difference between previous frame data of the left eye image and current frame data of the left eye image or a difference between previous frame data of the right eye image and current frame data of the right eye image.

4. The electronic device of claim 1, wherein, the 3D depth value is determined based on a difference between current frame data of the left eye image and current frame data of the right eye image.

5. The electronic device of claim 1, wherein the display panel driver is configured to convert RGB data of left eye image data for the first pixels into YCoCg data of the left eye image data, and
   wherein the display panel driver is configured to convert RGB data of right eye image data for the second pixels into YCoCg data of the right eye image data.

6. The electronic device of claim 5,
   wherein the display panel driver is configured to convert the RGB data of the left eye image data into the YCoCg data of the left eye image data and to determine an average Y value of an M-th even-numbered pixel row of an N-th frame left eye image data using an equation "YH_NML_EVEN_AVG=ROUNDUP(YH_NML_EVEN_SUM/N_PH)", and
   wherein the display panel driver is configured to convert the RGB data of the right eye image data into the YCoCg data of the right eye image data and to determine an average Y value of an M-th even-numbered pixel row of an N-th frame right eye image data using an equation "YH_NMR_EVEN_AVG=ROUNDUP(Y_NMR_EVEN_SUM/N_PH)",
   where YH_NML_EVEN_AVG is the average Y value of the M-th even-numbered pixel row of the N-th frame left eye image data, ROUNDUP is a function which rounds up to one decimal place, YH_NML_EVEN_SUM is a sum of the Y values of the M-th even-numbered pixel row of the N-th frame left eye image data, N_PH is a number of columns of the first pixels and the second pixels, YH_NMR_EVEN_AVG is the average Y value of the M-th even-numbered pixel row of the N-th frame right eye image data, and YH_NMR_EVEN_SUM is a sum of the Y values of the M-th even-numbered pixel row of the N-th frame right eye image data (N is a positive integer greater than or equal to 2 and M is a positive integer greater than or equal to 1).

7. The electronic device of claim 6, wherein the display panel driver is configured to determine an image motion value of the N-th frame left eye image data based on an average Y value of M-th even-numbered pixel row of N−1-th frame left eye image data and the average Y value of the M-th even-numbered pixel row of the N-th frame left eye image data.

8. The electronic device of claim 7, wherein, the display panel driver is configured to determine the image motion value of the N-th frame left eye image data using an equation "Y_NL_MOVE=ROUNDUP{SUM(|YH_NML_EVEN_AVG−YH_N−1ML_EVEN_AVG|)/(N_PV*0.5)}",
   where Y_NL_MOVE is the image motion value of the N-th frame left eye image data, SUM is a function which calculates a sum value, YH_N−1ML_EVEN_AVG is the average Y value of the M-th even-numbered pixel row of the N−1-th frame left eye image data, and N_PV is a number of rows of the first pixels and the second pixels.

9. The electronic device of claim 6, wherein the display panel driver is configured to determine an image motion value of the N-th frame right eye image data based on an average Y value of M-th even-numbered pixel row of N−1-th frame right eye image data and the average Y value of the M-th even-numbered pixel row of the N-th frame right eye image data.

10. The electronic device of claim 9, wherein, the display panel driver is configured to determine the image motion value of the N-th frame right eye image data using an equation "Y_NR_MOVE=ROUNDUP{SUM(|YH_NMR_EVEN_AVG−YH_N−1MR_EVEN_AVG|)/(N_PV*0.5)}",
   where Y_NR_MOVE is the image motion value of the N-th frame right eye image data, SUM is a function which calculates a sum value, YH_N−1MR_EVEN_AVG is the average Y value of the M-th even-numbered pixel row of the N−1-th frame right eye image data, and N_PV is a number of rows of the first pixels and the second pixels.

11. The electronic device of claim 6, further comprising a processor configured to output the left eye image data and the right eye image data to the display panel driver,
   wherein the processor is configured to determine a 3D depth value of the N-th frame left eye image data and the N-th frame right eye image data based on the average Y value of the M-th even-numbered pixel row of the N-th frame left eye image data and the average Y value of the M-th even-numbered pixel row of the N-th frame right eye image data.

12. The electronic device of claim 11, wherein the processor is configured to determine the 3D depth value of the N-th frame left eye image data and the N-th frame right eye image data using an equation "Y_N_DEPTH=ROUNDUP{SUM(|YH_NML_EVEN_AVG−YH_NMR_EVEN_AVG|)/(N_PV*0.5)}",
   where Y_N_DEPTH is the 3D depth value of the N-th frame left eye image data and the N-th frame right eye image data, SUM is a function which calculates a sum value, and N_PV is a number of rows of the first pixels and the second pixels.

13. The electronic device of claim 5,
   wherein the display panel driver is configured to convert the RGB data of the left eye image data into the YCoCg data of the left eye image data and to determine an average Y value of an M-th odd-numbered pixel row of an N-th frame left eye image data using an equation "YH_NML_ODD_AVG=ROUNDUP(YH_NML_ODD_SUM/N_PH)", and
   wherein the display panel driver is configured to convert the RGB data of the right eye image data into the YCoCg data of the right eye image data and to determine an average Y value of an M-th odd-numbered pixel row of an N-th frame right eye image data using an equation "YH_NMR_ODD_AVG=ROUNDUP(Y_NMR_ODD_SUM/N_PH)", where YH_NML_ODD_AVG is the average Y value o of the M-th odd-numbered pixel row of the N-th frame left eye image data, ROUNDUP is a function which rounds up to one decimal place, YH_NML_ODD_SUM is a sum of the Y values of the M-th odd-numbered pixel row of the N-th frame left eye image data, N_PH is a number of columns of the first pixels and the second pixels, YH_NMR_ODD_AVG is the average Y value of the M-th odd-numbered pixel row of the N-th frame right eye image data, and YH_NMR_ODD_SUM is a sum of the Y values of the M-th odd-numbered pixel row of the N-th frame right eye image data (N is a positive integer greater than or equal to 2 and M a positive integer greater than or equal to 1).

14. The electronic device of claim 13, wherein the display panel driver is configured to determine the image motion value of the N-th frame left eye image data based on an average Y value of M-th odd-numbered pixel row of N−1-th frame left eye image data and the average Y value of the M-th odd-numbered pixel row of the N-th frame left eye image data.

15. The electronic device of claim 13, further comprising a processor configured to output the left eye image data and the right eye image data to the display panel driver,
wherein the processor is configured to determine a 3D depth value of the N-th frame left eye image data and the N-th frame right eye image data based on the average Y value of the M-th odd-numbered pixel row of the N-th frame left eye image data and the average Y value of the M-th odd-numbered pixel row of the N-th frame right eye image data.

16. A method of driving an electronic device, the method comprising:
receiving left eye image data and right eye image data;
determining an image motion value;
determining a 3D depth value; and
determining a 2D image mode in which a left eye image and a right eye image which are identical to each other are displayed or a 3D image mode in which the left eye image and the right eye image which are different from each other are displayed based on the image motion value and the 3D depth value,
wherein, when the image motion value is greater than a motion threshold value, the 3D depth value is greater than a depth threshold value, and a duration time during which the image motion value is greater than the motion threshold value and the 3D depth value is greater than the depth threshold value is greater than a duration time threshold value, a first display panel and a second display panel display in the 2D image mode.

17. The method of claim 16, wherein, when the image motion value is less than or equal to the motion threshold value or the 3D depth value is less than or equal to the depth threshold value, the first display panel and the second display panel display in the 3D image mode.

* * * * *